(12) United States Patent
Harishankar et al.

(10) Patent No.: US 12,100,316 B2
(45) Date of Patent: Sep. 24, 2024

(54) ASSISTING REMOTE EDUCATION LEARNERS

(71) Applicant: INTERNATIONAL BUSINESS MACHINES CORPORATION, Armonk, NY (US)

(72) Inventors: Raman Harishankar, Blacklick, OH (US); Stan Kevin Daley, Espanola, NM (US); Shami Gupta, Bidhan Nagar (IN); Sabyasachi Chatterjee, Bangalore (IN); Sandipan Sengupta, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 12 days.

(21) Appl. No.: 17/935,278

(22) Filed: Sep. 26, 2022

(65) Prior Publication Data
US 2024/0105074 A1    Mar. 28, 2024

(51) Int. Cl.
*G09B 7/02* (2006.01)
*G06N 5/02* (2023.01)
*G06N 5/022* (2023.01)

(52) U.S. Cl.
CPC ............. *G09B 7/02* (2013.01); *G06N 5/022* (2013.01)

(58) Field of Classification Search
CPC .................................. G09B 7/02; G06N 5/022
See application file for complete search history.

(56) References Cited

U.S. PATENT DOCUMENTS 9,875,348 B2    1/2018 Sadeh
10,529,245 B2 *  1/2020 Gawlick ................. G09B 7/00
(Continued)

FOREIGN PATENT DOCUMENTS

CN    202120481 U    1/2012
CN    102710341 A    10/2012
(Continued)

OTHER PUBLICATIONS

Chuang, et al., "Detecting probable cheating during online assessments based on time delay and head pose" Higher Education Research Development, Mar. 21, 2017, pp. 16, (available at: https://www.sciencegate.app/document/10.1080/07294360.2017.1303456).

(Continued)

*Primary Examiner* — Eddy Saint-Vil
(74) *Attorney, Agent, or Firm* — KONRAD, RAYNES, DAVDA & VICTOR LLP; Janaki K. Davda

(57) ABSTRACT

Provided are techniques for assisting remote education learners. Data is collected for an actual base environment, a simulated base environment, and an exam environment for a learner taking an exam. The collected data is used to generate a first behavior pattern for the learner in the simulated base environment and a second behavior pattern for the learner in the exam environment. In response to the second behavior pattern deviating beyond a threshold from the first behavior pattern, a classification of non-cognitive learners class is determined for the learner. A de-bias technique is applied to the classification to generate a final classification. In response to the final classification being the non-cognitive learners class, education material for a subject covered in the exam is selected, and the educational material is played on a remote learner computer of the learner.

20 Claims, 18 Drawing Sheets

(56) References Cited

U.S. PATENT DOCUMENTS

| | | | |
|---|---|---|---|
| 2014/0205984 A1 | | 7/2014 | Chapman |
| 2020/0118042 A1* | | 4/2020 | Wang .................. G06N 5/022 |
| 2023/0350977 A1* | | 11/2023 | Guha .................. G06F 18/2148 |

FOREIGN PATENT DOCUMENTS

| | | |
|---|---|---|
| CN | 104463399 A | 3/2015 |
| CN | 104881743 A | 9/2015 |
| CN | 103942993 B | 5/2016 |
| CN | 104200328 B | 8/2017 |
| CN | 105791299 B | 7/2018 |
| CN | 112084994 A | 12/2020 |
| CN | 112085883 A | 12/2020 |
| CN | 112464793 A | 3/2021 |
| CN | 112488527 A | 3/2021 |
| CN | 113554909 A | 10/2021 |

OTHER PUBLICATIONS

Du et al., "Cheating Detection in Online Assessments via Timeline Analysis", ACM, SIGCSE 22, Mar. 3-5, 2022, Providence RI, USA, Feb. 2022, pp. 98-104, (available at https://dl.acm.org/doi/abs/10.1145/3478431.3499368).

Mell, P. et al., "The NIST Definition of Cloud Computing (Draft)", Sep. 2011, Computer Security Division Information Technology Laboratory National Institute of Standards and Technology, Total 7 pp.

Mell, P. et al., "Effectively and Securely Using the Cloud Computing Paradigm", [online], Oct. 7, 2009, retrieved from the Internet at http://csrc.nist.gov/groups/SNS/cloud-computing/cloud-computing-v26.ppt>, Total 80 pp.

IBM, "Leveraging education technology helps drive better learning outcomes and operations", retrieved from the Internet at https//www.ibm.com/in-en/industries/education, on Sep. 21, 2022, 8 pp.

IBM, "IBM Global University Programs", retrieved from the Internet at https://www.research.ibm.com/university/, on Sep. 21, 2022, 12 pp.

IBM, "Analysis Threshold Settings", Oct. 29, 2021, retrieved from the Internet at https://www.ibm.com/docs/es/iis/11.7?topic=settings-analysis-threshold, 6 pp.

Mysiak, "Classification Metrics & Thresholds Explained", Aug. 6, 2020, retrieved from the Internet at https://towardsdatascience.com/classification-metrics-thresholds-explained-caff18ad2747, 16 pp.

Simplilearn, "Classification in Machine Learning: What it is and Classification Models", Aug. 23, 2022, retrieved from the Internet at https://www.simplilearn.com/tutorials/machine-learning-tutorial/classification-in-machine-learning, 24 pp.

Zia, "Intelligent Workflow—A simple use case covering 5 emerging technologies (IoT, Blockchain, Machine Learning, Face Recognition, Natural Language Processing", Apr. 30, 2019, retrieved from the Internet at https://medium.com/cognitive-workflow/what-is-cognitive-workflow-c70c197e09ca, 10 pp.

Spangler, Gottfried, "Psychological and Physiological Responses During an Exam and Their Relation to Personality Characteristics", Psychoneuroendocrinology, vol. 22, No. 6, pp. 423-441, 1997.

Sreenidhi S.K. et al., "BPA: Behavior Pattern Analysis Based on the Research of B F Skinner", International Journal for Innovative Research in Multidisciplinary Field ISSN—2455-0620 vol. 3, Issue—4, Apr. 2017.

* cited by examiner

510 Exam Difficulty — Representative Values

| Exam Difficulty | Read | Write | Pause | Recheck |
|---|---|---|---|---|
| High | 30 | 60 | 20 | 10 |
| Medium | 10 | 50 | 15 | 10 |
| Low | 5 | 30 | 10 | 5 |

520 Preparedness — Representative Values

| Preparedness | Read | Write | Pause | Recheck |
|---|---|---|---|---|
| High | 30 | 60 | 20 | 10 |
| Medium | 10 | 50 | 15 | 10 |
| Low | 5 | 30 | 10 | 5 |

530 Exam Difficulty — Generic Representation

| Exam Difficulty | Read | Write | Pause | Recheck |
|---|---|---|---|---|
| High | | | | $v(n)$ |
| Medium | $v_1$ | $v_2$ | | $v(n)$ |
| Low | | | | $v(n)$ |

540 Preparedness — Generic Representation

| Preparedness | Read | Write | Pause | Recheck |
|---|---|---|---|---|
| High | | | | $v(n)$ |
| Medium | $v_1$ | $v_2$ | | $v(n)$ |
| Low | | | | $v(n)$ |

FIG. 5

| Input | Analysis | Score of i th interaction |
|---|---|---|
| Video and audio of learner during class captured through a camera and audio capture device | Video and audio analysis<br>Classification<br>Correlation<br>Use machine learning | (+/-)n1*Ai<br><br>(+/-)n1*Pai<br><br>(+/-)n1*Pri<br><br>(+/-)n1*Ii<br><br>(+/-)n1*Umi<br><br>(+/-)n1*Fi |
| Social media activity | | |
| Past behavioral patterns | | |

Simulated Base Environment Threshold Matrix — 800

| Read | Think | Write | Look out of Window | Read | Look at Watch | Think | Read |
|---|---|---|---|---|---|---|---|
| 2-6 | 9-14 | 40-65 | 15-20 | 6-12 | 1-2 | 3-5 | 3-5 |

Actual Exam Environment Matrix — 810

| Read | Think | Write | Look out of Window | Read | Look at Watch | Think | Read |
|---|---|---|---|---|---|---|---|
| 5 | 10 | 60 | 0 | 10 | 2 | 0 | 5 |

FIG. 8

Simulated Base Environment Threshold Matrix — 900

| Read | Think | Write | Look out of Window | Read | Look at Watch | Think | Read |
|---|---|---|---|---|---|---|---|
| B1*(2-6) | B2*(9-14) | B3*(40-65) | B4*(15-20) | B5*(6-12) | B6*(1-2) | B7*(3-5) | B8*(3-5) |

Actual Exam Environment Matrix — 910

| Read | Think | Write | Look out of Window | Read | Look at Watch | Think | Read |
|---|---|---|---|---|---|---|---|
| 5 | 10 | 60 | 0 | 10 | 2 | 0 | 5 |

FIG. 9

Simulated Base Environment Threshold Matrix — 1000

| | Read | Think | Write | Look to the left wall where a cheat sheet is pasted | Look at Watch | Think | Read |
|---|---|---|---|---|---|---|---|
| Read | 2-5 | | | | | | |
| Think | | 6-10 | | | | | |
| Write | | | 40-60 | | | | |
| Look to the left wall where a cheat sheet is pasted | | | | 15-20 | | | |
| Read | | | | | 4-10 | | |
| Look at Watch | | | | | | 0-2 | |
| Think | | | | | | | 2-5 |
| Read | | | | | | | 2-5 |

Actual Exam Environment Matrix — 1010

| Read | Think | Write | Look to the left wall where a cheat sheet is pasted | Read | Look at Watch | Think | Read |
|---|---|---|---|---|---|---|---|
| 4 | 10 | 50 | 18 | 9 | 2 | 5 | 5 |

Simulated Base Environment Threshold Matrix — 1050

| Read | Think | Write | Look to the left wall where a cheat sheet is pasted | Read | Look at Watch | Think | Read |
|---|---|---|---|---|---|---|---|
| B1*(2-5) | B2*(6-10) | B3*(40-60) | B4*(15-20) | B5*(4-10) | B6*(0-2) | B7*(2-5) | B8*(2-5) |

FIG. 10

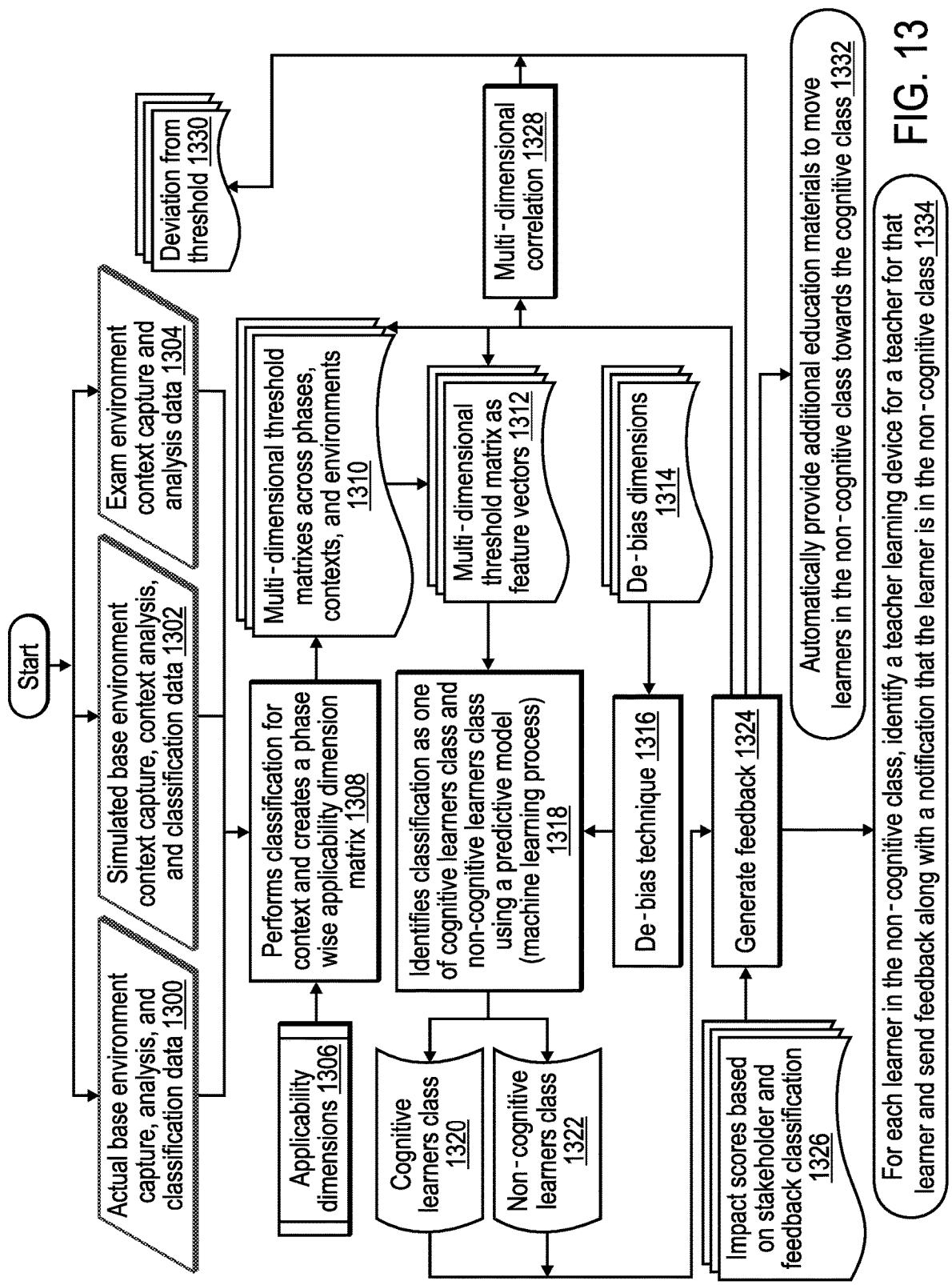

ASSISTING REMOTE EDUCATION LEARNERS

BACKGROUND

Embodiments of the invention relate to assisting remote education learners. In particular, embodiments of the invention relate to identifying learners who may improve performance on remote exams and automatically providing educational materials to the identified learners. In addition, embodiments of the invention relate to identifying examinees of remote exams for tailored invigilation.

A global pandemic disrupted education systems around the world. Many schools went online, as did exams, creating a new normal in the education system, with learners attending classes and taking the exams from remote environments (e.g., homes of learners).

SUMMARY

In accordance with certain embodiments, a computer-implemented method is provided for assisting remote education learners. Operations of the computer-implemented method collect data for an actual base environment, a simulated base environment, and an exam environment for a learner taking an exam. The operations use the collected data to generate a first behavior pattern for the learner in the simulated base environment and a second behavior pattern for the learner in the exam environment. In response to the second behavior pattern deviating beyond a threshold from the first behavior pattern, the operations determine a classification of non-cognitive learners class for the learner. The operations apply a de-bias technique to the classification to generate a final classification. In response to the final classification being the non-cognitive learners class, the operations select education material for a subject covered in the exam and play the educational material on a remote learner computer of the learner.

In accordance with other embodiments, a computer program product is provided for assisting remote education learners. The computer program product comprises a computer readable storage medium having program code embodied therewith, the program code executable by at least one processor to perform operations to collect data for an actual base environment, a simulated base environment, and an exam environment for a learner taking an exam. The operations use the collected data to generate a first behavior pattern for the learner in the simulated base environment and a second behavior pattern for the learner in the exam environment. In response to the second behavior pattern deviating beyond a threshold from the first behavior pattern, the operations determine a classification of non-cognitive learners class for the learner. The operations apply a de-bias technique to the classification to generate a final classification. In response to the final classification being the non-cognitive learners class, the operations select education material for a subject covered in the exam and play the educational material on a remote learner computer of the learner.

In accordance with yet other embodiments, a computer system is provided for assisting remote education learners. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations to collect data for an actual base environment, a simulated base environment, and an exam environment for a learner taking an exam. The operations use the collected data to generate a first behavior pattern for the learner in the simulated base environment and a second behavior pattern for the learner in the exam environment. In response to the second behavior pattern deviating beyond a threshold from the first behavior pattern, the operations determine a classification of non-cognitive learners class for the learner. The operations apply a de-bias technique to the classification to generate a final classification. In response to the final classification being the non-cognitive learners class, the operations select education material for a subject covered in the exam and play the educational material on a remote learner computer of the learner.

BRIEF DESCRIPTION OF THE SEVERAL VIEWS OF THE DRAWINGS

Referring now to the drawings in which like reference numbers represent corresponding parts throughout:

FIG. 5 illustrates applicability dimensions in accordance with certain embodiments.

FIG. 7 illustrates data about a learner's behavior during non-exam days in accordance with certain embodiments.

FIG. 8 illustrates a simulated base environment threshold matrix and an actual exam environment in accordance with certain embodiments.

FIG. 9 illustrates a de-bias technique in accordance with certain embodiments.

FIG. 10 illustrates another example of using a de-bias technique in accordance with certain embodiments.

FIG. 13 illustrates, in a flowchart, operations for classifying learners and providing feedback in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Remote exam invigilation (supervision of exams) and evaluation is intrinsically related to the education system. To address the sudden switch to remote learning and remote exams, embodiments enable conducting and evaluating exams remotely with the same levels of ease, reliability, fairness, and effectiveness as in-person exams. Based on performance on the remote exams, embodiments also identify examinees who may benefit from additional mentoring or educational materials to improve performance on future exams.

Figure 1:
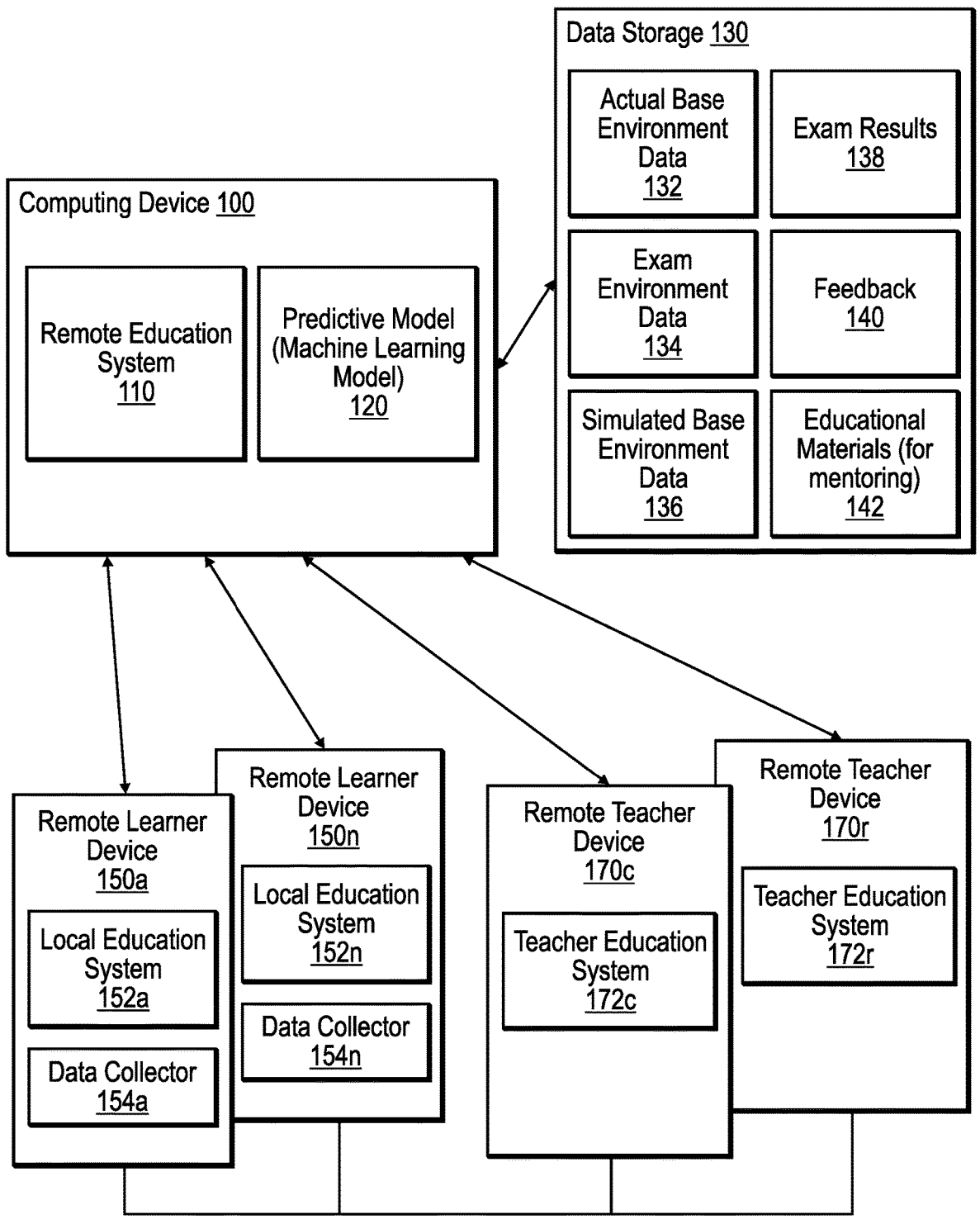
FIG. 1 illustrates, in a block diagram, a computing environment in accordance with certain embodiments.

FIG. 1 illustrates, in a block diagram, a computing environment in accordance with certain embodiments. A computing device 100 is connected to data storage 130. The computing device 100 is also connected to remote learner devices 150a . . . 150n and to one or more remote teacher devices 170c . . . 170r. Each remote learner device 150a . . . 150n is connected to at least one remote teacher device 170c . . . 170r.

The computing device includes a remote education system 110 and a machine learning model 120. The data storage 130 includes actual base environment data 132, exam environment data 134, simulated base environment data 136, exam results 138, feedback 140, and educational materials (for mentoring) 142.

The actual base environment data 132 includes data collected while a learner (i.e., a student) is in a class being taught by a teacher (i.e., in a daily learning environment). The simulated base environment data 136 includes data from a simulated base environment that may be defined by teachers or school administrators based on the exam guidelines. The exam environment data 134 includes data collected while a learner is taking an exam. While taking an exam, the learner may be referred to as an examinee. A learner may be of any age, of any ability level (e.g., differently abled), etc.

Each remote learner device 150a . . . 150n includes a local education system 152a . . . 152n and a data collector 154a . . . 154n. Each local education system 152a . . . 152n enables a learner to use the remote learner device 150a . . . 150n to participate in classes (e.g., to learn material that will be tested on exams) and to participate in exams (e.g., tests), remotely. In certain embodiments, the local education system 15sa . . . 152n provides access to a video conference with a remote teacher device 170c . . . 170r of a teacher to enable the learner to interact with the teacher. A teacher who is overseeing an exam may be referred to as a proctor.

Each data collector 154a . . . 154n collects data about the environment of the remote learner device 150a . . . 150n. The data collector 154a . . . 154n may collect the data via one or more cameras, one or more microphones (for spoken words), bodily worn learner biometric devices, sensors, Internet of Things (IoT) devices, etc. The one or more cameras capture video and images. In certain embodiments, the one or more cameras include one camera (e.g., a forehead camera) capturing what the examinee sees and another camera (e.g., a computer camera or a webcam) capturing the environment from another viewpoint.

Each remote teacher device 170c . . . 170r enables a teacher to teach a class or oversee an exam. In certain embodiments, the remote teacher device 170c . . . 170r provides access to a video conference with a remote learner device 150a . . . 150n to enable the teacher to interact with the learner.

With embodiments, the local education system 152a . . . 152n represents the learner's view of the remote education system 110, and the teacher education system 172c . . . 172r represents the teacher's view of the remote education system 110.

The remote education system 110 provides holistic remote education facilitating a continually growing number of cognitive learners and knowledge disseminators through cognitive remote class and exam invigilation (monitoring) and recommendations to teachers on efficient allocation of invigilation resources.

The remote education system 110 identifies cognitive learners and knowledge disseminators. To do this, the remote education system 110 identifies classes of cognitive learners and non-cognitive learners.

With embodiments, the remote education system 110 classifies learners in a cognitive learners and knowledge disseminators class (also referred to as a "cognitive learners" class)) and in a non-cognitive ("other") learners and knowledge disseminators class (also referred to as a "non-cognitive learners" class). In certain embodiments, cognitive learners may be described as learners who learn (acquire knowledge) in a cognitive way during classes and disseminate the knowledge they have learned during an exam. In certain embodiments, non-cognitive learners may be described as learners who have had more difficulty learning (acquiring knowledge) during classes and, so, have more difficulty disseminating the knowledge during the exam. In certain embodiments, cognitive learners may be described as those not needing additional mentoring to do well on the exam, while non-cognitive learners may be described as those needing mentoring to do better on the exam and to move into the cognitive learners class. In certain embodiments, cognitive learners may be described as more likely to adhere to exam guidelines, while non-cognitive learners may be described as less likely to adhere to exam guidelines.

With embodiments, the remote education system 110 applies a de-biasing technique to adjust for human bias for unbiased ("fair") identification of learners in the cognitive learners class and the non-cognitive learners class. Moreover, the remote education system 110 provides cognitive feedback to stakeholders (e.g., learners, teachers, parents, school administrators) and recommends appropriate mentoring based on the classification.

In certain embodiments, the remote education system 110 provides the mentoring by, for example, selecting educational materials (e.g., a video with instruction on a subject that the learner may need additional assistance in based on the exam results) for a learner in the non-cognitive learners class and automatically displaying (e.g., text about the subject) or automatically playing (e.g., a video on the subject) the educational materials on the remote learner device 150a . . . 150n using the local education system 152a . . . 152n.

In addition, the remote education system 110 measures the impact of mentoring by observing the flux of learners from the non-cognitive learners class to the cognitive learners class over time. Based on the impact of the mentoring, the remote education system 110 may adjust future feedback. For example, if the mentoring initially included displaying additional reading material on a particular subject on a remote learner device 150a via the local education system 152a . . . 152n and that did not lead to much of an increase in flux from the non-cognitive learners class to the cognitive learners class over time, the remote education system 110 may provide mentoring that includes playing a video on the particular subject in future.

With embodiments, the remote education system 110 facilitates remote exam invigilation. To do this, the remote education system 110 analyzes a learner's engagement in class (e.g., throughout an academic year) and determines a level of preparedness during an exam (online or in regular classroom). The remote education system 110 also analyzes a learner's behavioral patterns during exams and determines a propensity to follow the exam guidelines or not follow the exam guidelines. For example, the exam guidelines may say it is acceptable to use a calculator, but it is not acceptable to refer to notes/books during the exam. The remote education system 110 determines and quantifies, with a multi-dimensional simulated base environment matrix, a learner's behavioral pattern (i.e., a "first behavioral pattern" or a "simulated behavioral pattern") during simulated exam environments (i.e., based on phases of reading, writing, checking work, looking elsewhere, etc.) for various combinations of context dimensions (e.g., preparedness, exam difficulty, psychological state, etc.). In addition, the remote education system 110 determines and quantifies, with a multi-dimensional exam environment matrix, a learner's behavioral pattern (i.e., a "second behavioral pattern" or an "exam behavioral pattern") during actual exam environments (i.e., based on phases of reading, writing, checking work, looking elsewhere, etc.) for various combinations of context dimensions (e.g., preparedness, exam difficulty, psychological state, etc.). The remote education system 110 correlates the learner's behavioral pattern in a simulated exam environment (the first behavioral pattern) with the learner's behavioral pattern during the actual exam environment (the second behavioral pattern), and the remote education system 110 notifies (e.g., with an alert message) teachers when there is a deviation of the first and second behavioral patterns beyond a threshold.

In certain embodiments, the remote education system 110 provides a smart education integrated hybrid workflow. To do this, the remote education system 110 provides a propensity inclination-based classification of stakeholders (e.g., parents, teachers, and administrators) connected to the learners who may need more assistance. Propensity inclination may be described as a propensity to follow or not follow exam guidelines. The remote education system 110 provides cognitive feedback generated to each class of stakeholders through an impact scoring model that facilitates mentoring (e.g., in-person or remote mentoring of a learner by a teacher). The remote education system 110 provides a de-bias technique with reference to human bias in the feedback and with reference to identification of cognitive learners and non-cognitive learners. The remote education system 110 enables observing a gradual upliftment of learners from a non-cognitive learners class to a cognitive learners class.

The remote education system 110 may be described as contactless exam invigilation and evaluation. The remote education system 110 conducts remote exams with application of technology to conduct the remote exams in a way that attempts to give a similar experience to the participants (i.e., teachers and learners) as that of the traditional, in-person exams. The remote education system 110 allows exam organizers to better understand concepts that are to be applied for conducting remote exams. The remote education system 110 enables teachers to seamlessly monitor examinees in an instantaneous or a temporal way to understand and evaluate how closely their remote exam experience correlates with an in-person exam experience.

In certain embodiments, the remote education system 110 provides feedback aligned to each stakeholder (e.g., learner, parent, teacher, and school administrator). The feedback allows the parent, teacher, and/or school administrator to mentor the learner to improve performance on a future exam.

With embodiments, the remote education system 110 provides the mentoring by identifying subjects/areas that the learner may need assistance on based on evaluation of the how the learner performed on an exam, identifying educational material for these subjects/areas, and automatically sending the educational materials to the local education system 152a . . . 152n of the remote learner device 150a . . . 150n, and the local education system 152a . . . 152n displays (e.g., reading material) or plays (e.g., a video) the educational materials. In this manner, the remote education system 110 helps each learner improve performance on future exams based upon this additional educational experience.

In certain embodiments, the remote education system 110 also determines a learner's inclination towards following exam guidelines ("fair practice"). The remote education system 110 enable teachers to seamlessly determine the degree of fairness with which the remote exam was conducted for different learners in different embodiments and supports verification, reconciliation, corrective actions, etc. The reconciliation may be described as reconciling the accuracy of recommendations of learners for tailored invigilation (versus standard invigilation). In certain embodiments, the corrective actions may include giving a warning to a learner (e.g., one who is using a calculator although the exam guidelines do not allow use of a calculator), providing counseling (e.g., to ensure the learner understands that the calculator is not allowed in accordance with the exam guidelines), deducting points from the exam evaluation, special mentoring, disregarding answers that were provided without following the exam guidelines, reporting the learner to stakeholders for other actions, switching to tailored invigilation of the learner.

The remote education system 110 provides a shared infrastructure between the teachers and learners, where education may be imparted in a more convenient way, while attempting to replicate and enhance the traditional, in-person education system with technological innovation.

The remote education system 110 provides an approach for various aspects of the evaluation of classes remotely, which includes technology adoption, fairness of executing exams and delivery of results, measurement and monitoring, and learner understanding of concepts underlying the subject area in a holistic way.

Figure 2:
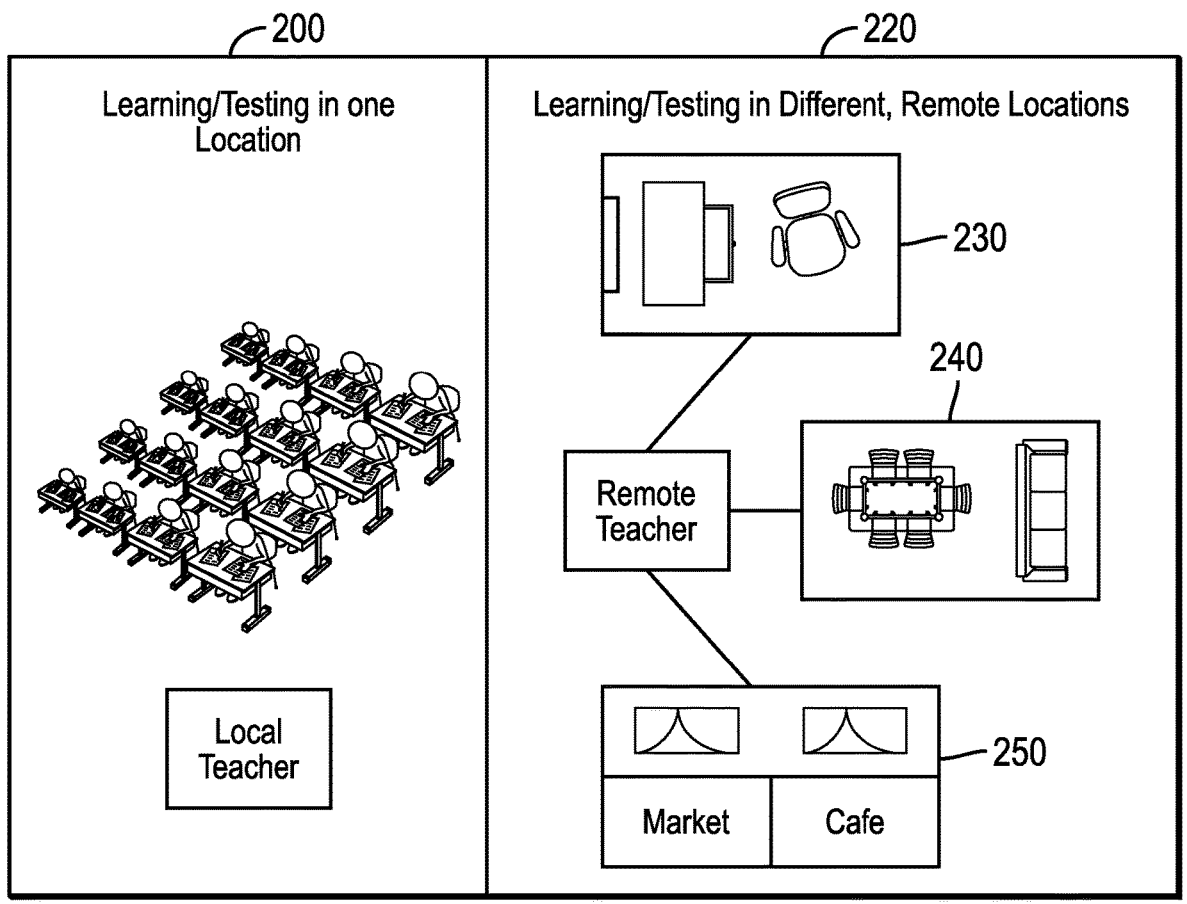
FIG. 2 illustrates an in-person environment versus remote environments in accordance with certain embodiments.

FIG. 2 illustrates an in-person environment 200 versus remote environments 220 in accordance with certain embodiments. In the in-person environment 200, the learners are sitting at the same type of desk, with the same surrounding environment (e.g., same sound level, etc.). The in-person environment 220 is a uniform exam environment for the learners, which leads to fairness of the exam across the learners. In addition, the local teacher is able to effectively monitor the exam by being physically present with the learners.

In the remote environments 220, a first learner is in a remote environment 230, a second learner is in a remote environment 240, and a third learner is in a remote environment 250. The remote environments 220 illustrate varied exam environments with little to no similarities between the remote environments. Because these environments are different and remote, the remote education system 110 allows better invigilation of the examinees to determine which ones are following exam guidelines.

Unlike conventional systems in which a remote teacher has limited infrastructure setup to determine which examinees are following exam guidelines, especially when there are a large number of examinees, the remote education system 110 collects data on the learners in their remote environments and determines which learners should have tailored invigilation.

Figure 3:
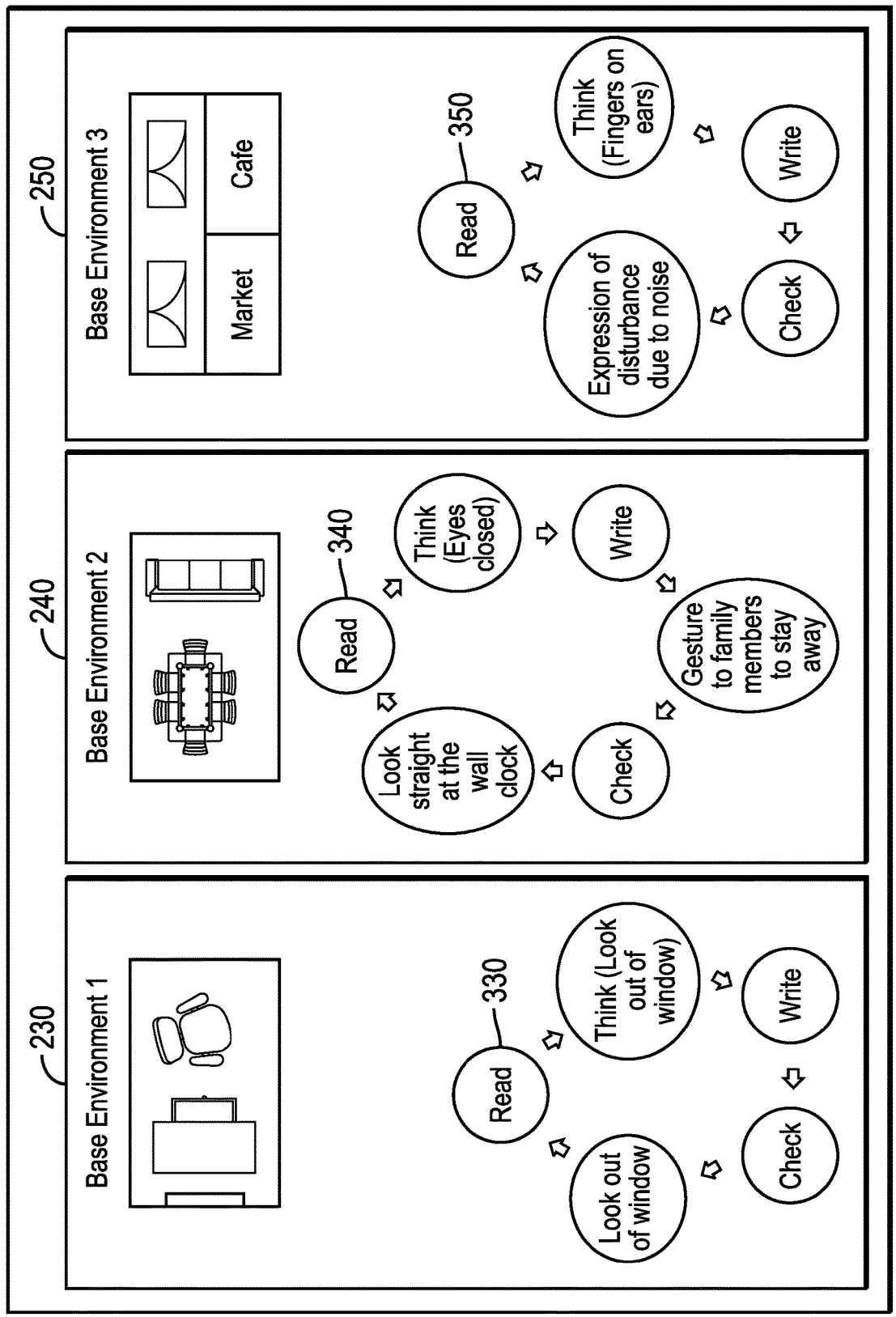
FIG. 3 illustrates further details of the remote environments in accordance with certain embodiments.

FIG. 3 illustrates further details of the remote environments 230, 240, and 250 in accordance with certain embodiments. In addition, FIG. 3 illustrates phases of cycles 330, 340, and 350. The remote education system 110 receives data about the behavior of each learner with reference to these example phases from the local education systems 152a . . . 152n.

In particular, the remote environment 230 shows that a learner may use a separate room in a home, with a desk, a chair, and a window. The remote environment 230 may be described as a peaceful room isolated from other family members, with very low background noise levels, and no interfering voices of other humans. For the remote environment 230, the remote education system 110 receives data about the cycles 230, in which the learner reads, thinks, writes, checks work, and looks out of the window. In this example, the remote environment 230 includes the window in the front and the examinee may look out the window in the "Think" phase.

In addition, the remote environment 240 shows that the learner may use a dining table, which is next to a living room sofa. The remote environment 240 may be described as a room in the home that is also shared with other family members, with many distractions, moderate background noise levels, voices of other humans, a continuous humming noise of a table fan, and a clock on the front wall facing the chair used by the learner. For the remote environment 340, the remote education system 110 receives data about the cycles 340, in which the learner reads, thinks, writes, gestures at family to stay away, checks work, and looks at the wall clock. In this example, the learner may close eyes while in the "Think" phase.

Moreover, the remote environment 250 shows that the learner is in a home above a busy market and a café. Environment 250 may be described as a home that has a lot of noise from crowds outside the home, with people shouting intermittently. The home may be a room that is isolated with no visual distractions. For the remote environment 250, the remote education system 110 receives data about the cycles 350, in which the learner reads, thinks, writes, checks, and expresses frustration at being disturbed by outside noise. In this example, the learner may cover ears with fingers while in the "Think" phase.

With embodiments, the remote education system 110 is able to capture the behavior (e.g., habits, traits, etc.) of a learner attending classes remotely (e.g., during the academic year) or taking an exam remotely. Based on this data, the remote education system 110 is able to determine whether someone may need additional assistance to improve on future exams or may need tailored invigilation during exams.

Figure 4A:
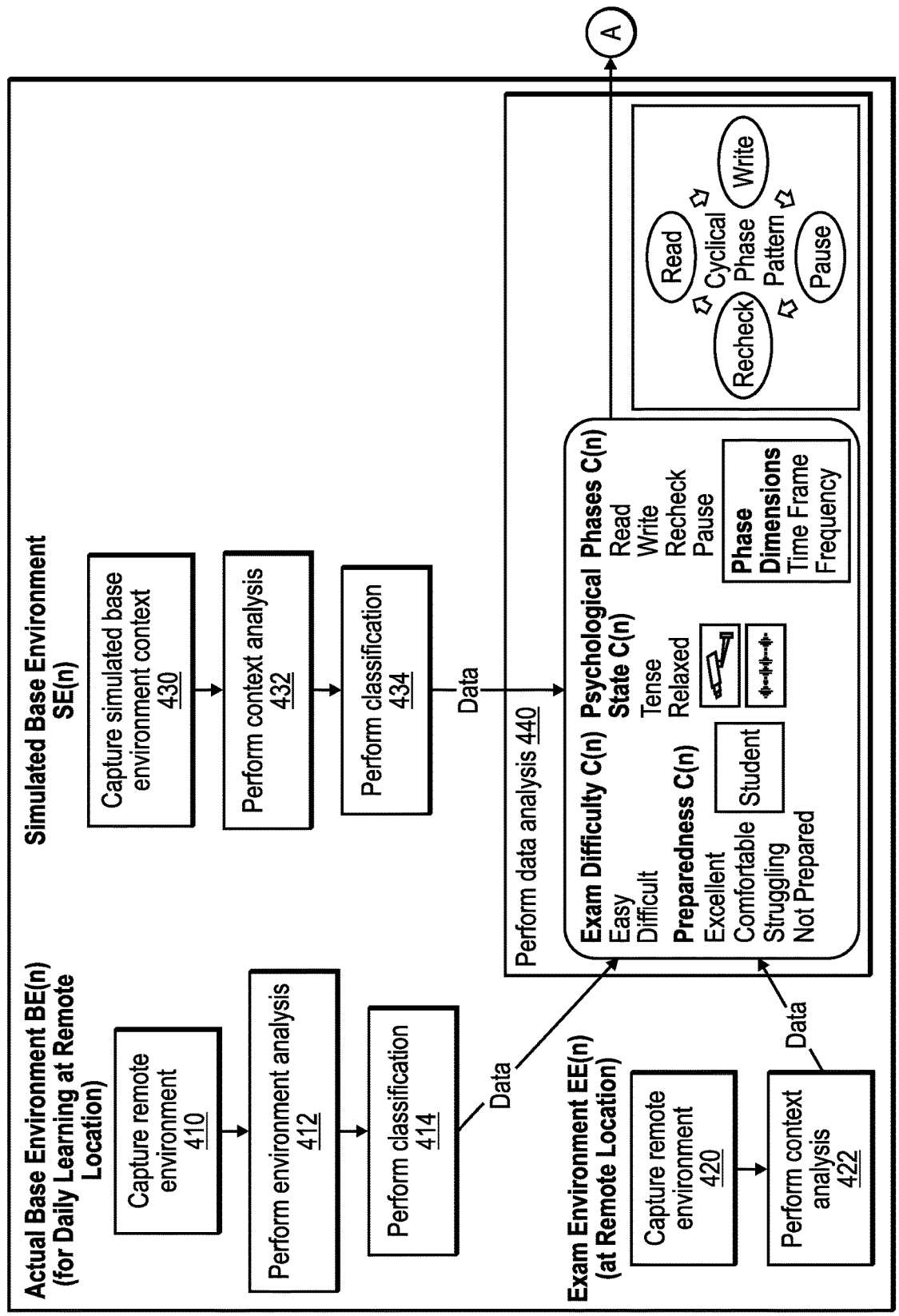
FIGS. 4A and 4B illustrate remote exam facilitation in accordance with certain embodiments.
Figure 4B:
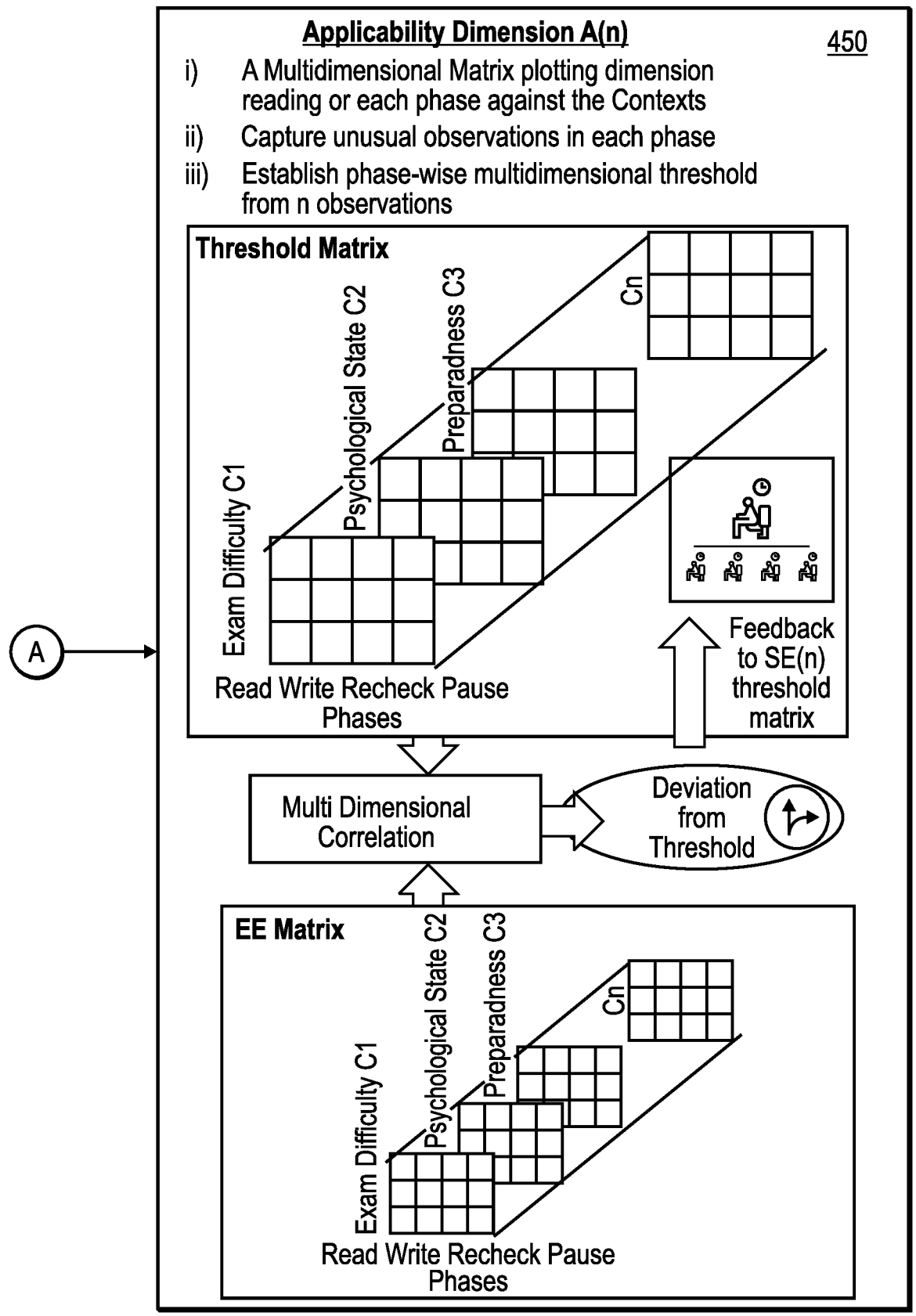

FIGS. 4A and 4B illustrate remote exam facilitation in accordance with certain embodiments. For an actual base environment BE(n) for daily learning at a remote location (such as the learner's home, a parent's office, a relative's home, etc.), in block 410, the remote education system 110 captures the remote environment. In particular, the remote education system 110 may perform the capture by collecting data from a webcam (e.g., images, videos, and/or sound), which includes using sound and vision. In block 412, the remote education system 110 analyzes the environment. In particular, the remote education system 110 may perform analysis of the environment with conversation analysis, tone analysis, visual recognition (e.g., recognizing faces and mapping to learners), facial expression analysis, gesture analysis, and context analysis. In block 414, the remote education system 110 performs classification based on performance of the learner in class (e.g., over a period covering an academic year or a set of classes). The remote education system 110 may perform the classification by classifying class quizzes (e.g., good/average/needs assistance), class work (e.g., good/average/needs assistance), homework (e.g., good/average/needs assistance), and weekly assessments (e.g., good/average/needs assistance). In certain embodiments, the remote education system 110 uses the classifications, the data captured about the actual remote environment, and the analyzed data in block 440.

For an exam environment (EE) at a remote location (such as the learner's home, a parent's office, a relative's home, etc.), in block 420, the remote education system 110 captures the remote environment. In particular, the remote education system 110 may capture data, which may be described as base signals as the data may be captured from cameras, microphones, bodily worn learner biometric devices, sensors, Internet of Things (IoT) devices, etc. For example, the remote education system 110 may perform the capture by collecting data from a webcam, a forehead camera, a microphone, bodily worn learner biometric devices, sensors, Internet of Things (IoT) devices, etc. Both sound and vision (e.g., videos and images) may be captured via the webcam and the forehead camera. In block 422, the remote education system 110 performs context analysis. The context analysis may include visual recognition, facial expression analysis, gesture analysis, and biometric analysis. In certain embodiments, the remote education system 110 uses the analyzed data and the data captured about the exam environment in block 440.

For the simulated base environment SE(n), in block 430, the remote education system 110 captures the simulated base environment. In particular, the remote education system 110 performs the capture by collecting data from a webcam, a forehead cam, a microphone, bodily worn learner biometrics, etc. With embodiments, the simulated base environment may simulate any combination of classes, exams, and class quizzes. The objective of the simulated base environment is to bridge any gap between the actual base environment and the exam environment.

In block 432, the remote education system 110 performs context analysis. In particular, the remote education system 110 performs the context analysis with visual recognition, facial expression analysis, gesture analysis, and biometric analysis. In block 434, the remote education system 110 performs classification based on performance of the learner in class using data from the simulated base environment. The classification may include classifying class quizzes (e.g., good/average/needs assistance), class work (e.g., good/average/needs assistance), homework (e.g., good/average/needs assistance), and weekly assessments (e.g., good/average/needs assistance). In certain embodiments, the remote education system 110 uses the classification, the data captured about the simulated remote environment, and the analyzed data in block 440.

In block 440, the remote education system 110 uses the data from the actual base environment, the exam environment, and the simulated base environment to generate, for phases C(n) (of read, write, recheck, and pause) and phase dimensions (of time frame (i.e., periodicity) and frequency of each phase):

Exam difficulty (C(n)) as easy or difficult;
Preparedness C(n) of the learner as excellent, comfortable, or yet to be comfortable; and
Psychological state C(n) of the learner as tense or relaxed.

From block 440 (FIG. 4A), processing continues to block 450 (FIG. 4B). In block 450, the remote education system 110 generates applicability dimensions A(n) by generating a multi-dimensional threshold matrix for a simulated base environment and a multi-dimensional exam environment (EE) matrix for the exam environment. The remote education system 110 plots, for the multi-dimensional threshold matrix, a dimension for each phase against context, identifying observations in each phase, and establishing a phase-wise multi-dimensional threshold from n observations. The remote education system 110 identifies a correlation (c1, c2, c3, . . . cn) (i.e., a first behavioral pattern) for the multi-dimensional threshold matrix.

The remote education system 110 plots, for the multi-dimensional exam environment (EE) matrix, each phase against a context dimension (e.g., preparedness, exam difficulty, psychological state, etc.). The remote education system 110 identifies a correlation (c1, c2, c3, . . . cn) (i.e., a second behavioral pattern) for the multi-dimensional exam environment (EE) matrix.

The remote education system 110 generates a multi-dimensional correlation. In certain embodiments, the remote education system 110 finds the multi-dimensional correlation based on values of each phase (e.g., read, write, recheck, pause) and phase frequency against values of each context dimension (e.g., preparedness, exam difficulty, psychological state, etc.). In certain embodiments, the remote education system 110 derives the correlation between the simulated base environment and the exam environment for each learner from the first behavioral pattern and the second behavioral pattern.

The remote education system 110 determines whether the first behavioral pattern deviates from the second behavioral pattern and sends feedback to a) the simulated base environment SE(n) for use in updating the threshold matrix and b) to one or more stakeholders for taking action (e.g., related to invigilation and/or mentoring). In addition, the remote education system 110 performs mentoring of the learner.

In certain embodiments, the remote education system 110 captures the base environment by capturing the base environment dimensions, context, and applicability dimensions.

In certain embodiments, the base environment dimensions are:
a) data entities E(n), where the data entities E(n) (e.g., webcam, a forehead camera, a microphone, bodily worn learner biometric devices, etc.) are measured against each phase, along with time frame and frequency, while learners appear in a mock or simulated exam environment SE(n);
b) various measuring premises Pr(n) that include phases and states, where the states may be described as exam time dynamics (e.g., "under no time pressure" or "under time pressure" for a psychological state), and where the premises may be described as context or dimensions, and, against each of the premises, the audio and video data are measured against each phase with time frame and frequency; and
c) other historical data available in social media, such as psychometric analysis Pc(n) and sentiment physiological emotional states Ph(n).

In certain embodiments, there is a context C(n) against which the base environment, an exam environment, and a simulated base environment is recorded. In certain embodiments, the context includes context dimensions of exam difficulty, preparedness of the examinee, and psychological state. In other embodiments, the context may include other contexts, such as an examinee's propensity inclination to follow exam guidelines.

In certain embodiments, the applicability dimensions may be described as various patterns of observations A(n), in the form of patterns that help to identify how close the behavior during exam time is to behavior in the simulated base environment.

In certain embodiments, the remote education system 110 provides a holistic technique with a multi-dimensional approach towards observation of a learner's engagement during an entire academic session. The remote education system 110 may define certain dimensions of interest. In certain embodiments, the remote education system 110 captures the base environment for conducting an exam. The remote education system 110 adopts appropriate audio visual reception, including a forehead cam vision, to get a near 360 view of the exam environment. With this, the remote education system 110 is able to identify a learner's behavior patterns and physiological patterns with reference to context dimensions of exam difficulty, preparedness of the examinee, psychological state, and phases. With embodiments, the context dimensions may also include healthiness of mental and physical state, along with, question type and difficulty levels. These patterns also have a multi-dimensional nature with reference to the different phases, such as read, write, recheck, and pause.

The remote education system 110 identifies the multi-dimensional patterns throughout the academic session as well as during the exam, with base environment capture prior to conducting the exam. The remote education system 110 analyzes the multi-dimensional attributes, including inclination to follow the exam guidelines, under multi-dimensional context against the multi-dimensional threshold. The remote education system 110 enables teachers to conduct the exam in real time, while monitoring and analyzing the multi-dimensional patterns from data collection during exam phases. In certain embodiments, the remote education system 110 compares the learner's behavior during the academic session in a simulated base environment with the learner's behavior during the exam to determine a deviation from a threshold. Based on the deviation, the remote education system 110 provides recommendations to the teacher to provide tailored focus/attention to the learner taking the exam and to take any appropriate actions.

In certain embodiments, for a learner's behavioral pattern during class (non-exam days), the remote education system 110 determines that an overall high negative score on attributes across interactions in a definite time frame (e.g., an academic year) indicates that the learner has a higher propensity to not follow the exam guidelines during the exam under any circumstances. In such cases, the remote education system 110 notifies the teachers so that they may be vigilant on the learner's activities during an exam.

In certain embodiments, for a learner's behavioral pattern during class (non-exam days), the remote education system 110 determines that an overall high positive score on attributes across interactions in a definite time frame (e.g., an academic year) indicates that the learner has a higher propensity to follow the exam guidelines during an exam under any circumstances. In certain embodiments, for a learner behavioral pattern during class (non-exam days), the remote education system 110 determines notifies the teaches there is a lower need to be vigilant on the learner's activities during an exam.

In certain embodiments, for a learner's behavioral pattern during class (non-exam days), the remote education system 110 determines that a mixed score on attributes across interactions in a definite time frame (e.g., an academic year) indicates that the learner's inclination is to be opportunistic, and, under strict invigilation, the learner is likely to follow the exam guidelines, but under lenient invigilation the learner may not follow the exam guidelines.

In certain embodiments, the remote education system 110 uses this scoring of behavioral patterns during non-exam days to determine deviation of outcome on exam days. For example, when an examinee with an overall high positive score gets very low marks during an exam, the remote education system 110 may notify the teacher that there should be a recheck of exam papers to ensure there were no errors for this particular learner. As another example, when an examinee with an overall high positive score gets very low marks during an exam, the remote education system 110 may identify a psychological condition (e.g., fear of taking exams) for the examinee and may recommend counselling for the examinee.

With embodiments, the remote education system 110 records the base environment dimensions BE(n) (given under the simulated base environment SE(n)) {E(n), Pr(n), Pc(n), Ph(n)}. With sufficient data collected over time, the remote education system 110 determines that this BE(n) shows a specific range of variability or a pattern when applied against the contexts C(n). With embodiments, the data collection may happen in the simulated base environment SE(n), and the exam administrators may organize the simulation environment.

In certain embodiments, the remote education system 110 records the base environment dimensions BE(n) (given under an exam environment EE(n)). The remote education system 110 identifies patterns and analyzes the patterns per each of the applicability dimensions A(n). If the comparison of observed patterns during a real exam (given under exam environment EE(n)) against patterns of the simulated base environment (given under simulated base environment SE(n)) align within a threshold Th(n), the remote education system 110 determines that the examinee took the exam in accordance with the exam guidelines (i.e., it was a fair exam). If the comparison of observed patterns during the real exam (given under exam environment EE(n)) against patterns of the simulated base environment (given under simulated base environment SE(n)) did not align within the threshold Th(n), the remote education system 110 determines that the examinee did not take the exam in accordance with the guidelines. Such an examinee may be asked to answer further questions or the teacher may review the recording of the examinee during the exam.

In certain embodiments, the threshold Th(n) for the particular examinee may be taken as a statistical mean of the subjects (i.e., topics, such as history, math, etc.) being tested. The threshold improves over time with more data and feedback. Alternately. the Th(n) may be determined based on a threshold for each subject for each classification of cognitive learner and non-cognitive learner. With embodiments, the threshold may be a range of values.

In certain embodiments, there is a hierarchy of the base environment dimensions, and the dimensions earlier (higher) on the list may have higher weight in order of: recording of footage, webcam video/images/sound, forehead camera video/images/sound, microphone sound, periodicity, and phases.

In certain embodiments, the remote education system 110 identifies the read phase (and optionally the think phase) from the candidate's data (e.g., visual data from the forehead cam, as well as a webcam, and from audio voice or any other human interpretable frequency (e.g., Morse code)). The remote education system 110 may identify the exam paper or part of the exam paper. In certain embodiments, the remote education system 110 compares any visual data (e.g., video and images) during a read phase with sample answers for the part of the questions that are not answered yet. That is, a match to the comparison indicates that during the read phase, the examinee looked for the answer to a later question that is to be answered, and this may be against the exam guidelines as an examinee is allowed to look at a question during read phase and not an answer for a question that has not been attempted yet.

In certain embodiments, the remote education system 110 identifies the write phase (and optionally the think phase) from the candidate's data (e.g., visual data from the forehead cam, as well as a webcam, and from audio voice or any other human interpretable frequency (e.g., Morse code)). The remote education system 110 may identify the exam paper or part of the exam paper, an answer or part of the answer (which has been written), a blank section immediately after the ongoing answer part (unless either the next subjective answer was already answered in a place holder without maintaining video, images and/or sound order of answer or the following objective answer is blank if not already answered). That is, video, images and/or sound of a write frame are checked for adherence to exam guidelines to ensure that the examinee has not written an answer to a later question that should not be completed at the current time.

In certain embodiments, the remote education system 110 does not interpret data as translated or interpreted that is compared with the answer card (be it an objective type or a descriptive type of answer) that is not yet attempted. The remote education system 110 may not identify data with a pattern, such as: (RFrame t1=WFrame t2, RFrame t3=WFrame t4, RFrame t5=WFrame t6), while RFrames are portions of the exam from the read phase and WFrames are portions of the exam from the write phase.

In certain embodiments, the remote education system 110 compares audio data (e.g., from the examinee speaking) with the answer sheet to determine whether the examinee is following exam guidelines.

In certain embodiments, the remote education system 110 identifies optional phases of cross verify, recheck or pause (and optionally a plan for a next selection) based on: statistics such as average, minimum and maximum of time frame and frequency of each phase from multiple iterations) and/or physiological sentiment signals (e.g., from analysis of biometric signals, and psychometric analysis of recent social communication).

In certain embodiments, the remote education system 110 identifies context against which an actual and/or simulated base environment is recorded and has the following context dimension hierarchy: preparedness (e.g., excellent, comfortable, struggling, not prepared; exam time dynamics (e.g., time, question/subject difficulty level), psychological state (e.g., tense, relaxed, casual), exam difficulty, etc.

Examples of other contexts may be: one in which there was a loss within a year for the examinee, one in which the examiner has had to make a big decision about life or a job, one in which the examinee is struggling economically, one in which the examinee's propensity inclination dimension for ethical behavior is following the exam guidelines, etc.

FIG. 5 illustrates applicability dimensions in accordance with certain embodiments. In certain embodiments, the hierarchy of dimensions for applicability dimensions is: pattern and deviation. With embodiments, the deviation is for each actual phase of the actual base environment versus the simulated phase of the simulated base environment with reference to a sustained or periodic spike. A spike may be described as a large deviation in the time frame or frequency. In FIG. 5, the applicability dimensions are illustrated as single dimensions for different phases, however, the applicability dimensions may instead be multi-dimensional. In FIG. 5, the example applicability dimensions are: exam difficulty versus phases with representative values for actual exam environments 510, preparedness versus phases with representative values for actual exam environments 520, exam difficulty versus phases with generic values for simulated base environments 530, and preparedness versus phases with generic values for simulated base environments 540.

Figure 6:
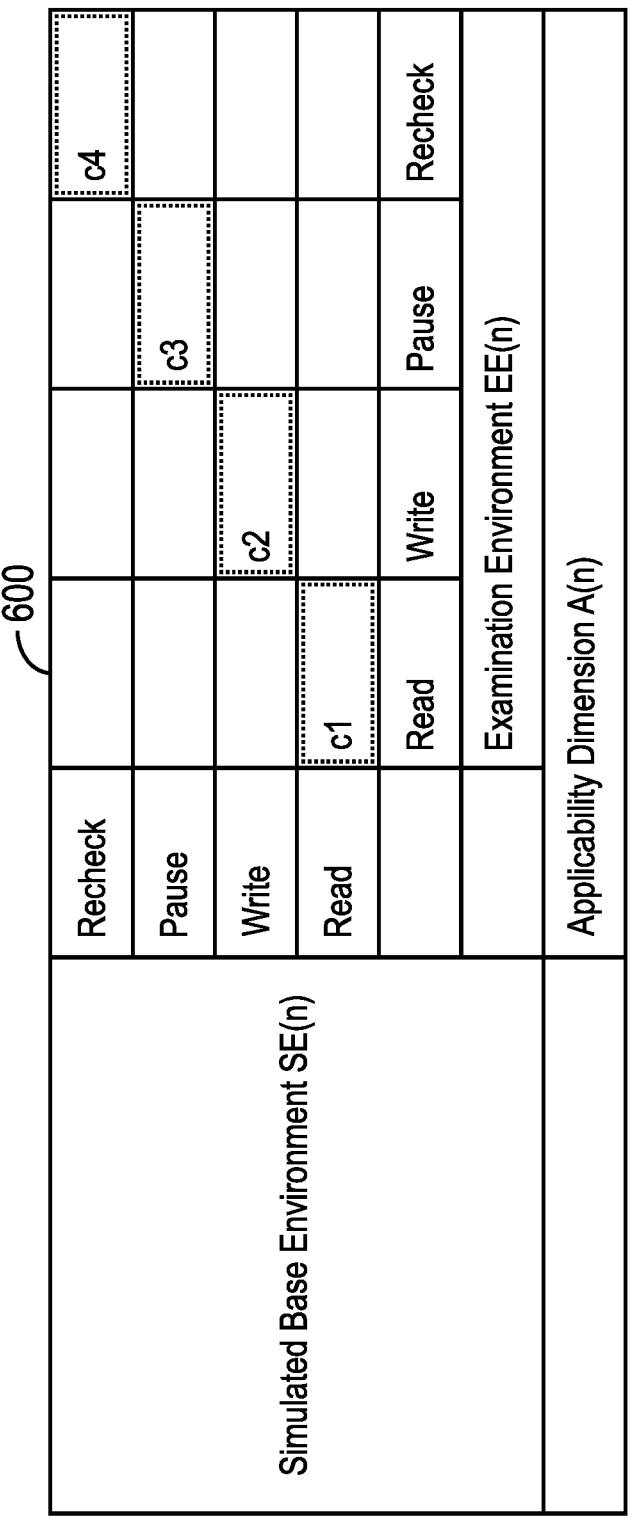
FIG. 6 illustrates applicability dimensions with a simulated base environment versus an exam environment in accordance with certain embodiments.

FIG. 6 illustrates applicability dimensions with a simulated base environment versus an exam environment 600 in accordance with certain embodiments. The remote education system 110 takes applicability dimension readings for each applicability dimension and for each of the phases. The remote education system 110 creates a multi-dimensional threshold matrix, which records the applicability dimension readings for each combination of applicability dimension and phase. The multi-dimensional threshold matrix has n number of simulated base environments SE(n) for each learner, and, from this, the remote education system 110 establishes a threshold for each learner. In certain embodiments, the threshold is the specified cut off for an observation to be classified as either a cognitive learner or a non-cognitive learner. With embodiments, the specific technique to arrive at the threshold depends on the specific frequency distribution that comes from the data. For the context example, the threshold reflects the range of values (time frame, frequency, etc.) for each phase (read, write, pause, recheck etc.) that are considered as acceptable consistent measured signals for each identified phase. That is, with embodiments, the threshold is learner specific.

The remote education system 110 also takes applicability dimension readings for each phase for the actual exam environment EE(n). Then, the remote education system 110 derives a correlation (e.g., c1, c2, c3, c4) in the simulated base environment and another correlation (e.g., c1, c2, c3, c4) in the exam environment 600 of each applicability dimension for each phase. The remote education system 110 tracks the deviation of the learner's behavior during the actual exam environment from the threshold.

FIG. 7 illustrates data 700 about a learner's behavior during non-exam days in accordance with certain embodiments. With reference to a learner's behavioral pattern during non-exam days, the remote education system 110 may capture the following attributes: attentiveness in class (variable A, weight −n1 to +n1), participation in study related activities (e.g., class work, homework, class quizzes, etc., with variable Pa, weight −n1 to +n1), preparedness on lessons taught (e.g., scores in class activities, with variable Pr, weight −n1 to +n1), inclination to catch the teacher's attention (e.g., no response when the teacher calls out name in online class, putting forward excuses when the teacher calls out name, etc., with variable I, weight −n1 to +n1), inclination follow the exam guidelines even when opportunity exists to not follow the exam guidelines (e.g., observed that book was open in online class when teacher asked a question, observed prompting by others during online class, etc., with variable Um weight −n1 to +n1), and observed behavioral traits of close friend circle (variable F weight −n1 to +n1). With embodiments, the learner's behavior is based on video and audio data, social media activity, and past behavioral patterns. Then, the remote education system 110 analyzes the video and audio data, performs classification, derives a correlation, and uses machine learning to classify learners in the cognitive learners class and the non-cognitive learners class during non-exam days.

FIG. 8 illustrates a simulated base environment threshold matrix 800 and an actual exam environment matrix 810 in accordance with certain embodiments. In an actual exam environment, the examinee may be more serious and may concentrate more on writing the exam than in the simulated base environment. This may lead to a bias in the technique to flag typical exam behavior as a beyond-threshold behavior. In the example of FIG. 8, two of the phases are missing (shown as "0") in the actual exam environment matrix 810. The remote education system 110 identifies this as breaching the threshold in the actual exam environment and alerts the invigilator. However, in this example, the examinee is focusing more during the actual exam environment than in the simulated base environment, hence, the two missing phases in the actual exam environment skew the result as the is no intention of the learner not following the exam guidelines.

FIG. 9 illustrates a de-bias technique in accordance with certain embodiments. In FIG. 9, a simulated base environment threshold matrix 900 has been adjusted with weights, while the actual exam environment matrix 910 is not adjusted with weights. In particular, the remote education system 110 adds a bias weight Bn against each phase of the simulated base environment. Then, a feedback loop from stake holders (e.g., parents, teachers, and school administrators) continuously adjusts the values of Bn to reflect a more accurate behavioral outcome. With embodiments, in a non-biased situation, Bn=1.

FIG. 10 illustrates another example of using a de-bias technique in accordance with certain embodiments. In this example, an examinee does not follow exam guidelines and adopts unfair means in the simulated base environment. Then, that behavior becomes a part of the examinee's simulated base environment and is reported as a behavior within a threshold in the actual exam environment. In this example, the actual exam environment matrix 1010 matches with the simulated base environment threshold matrix 1000, but there is an unfair practice adopted. In this example, the remote education system 110 detects that the examinee is not following the exam guidelines through image recognition via a head mounted camera, as well as, regular invigilation. The remote education system 110 applies a de-bias technique by adding weights against each phase of the simulated base environment threshold matrix 1050 and adjusting the weights through the feedback loop.

Figure 11:
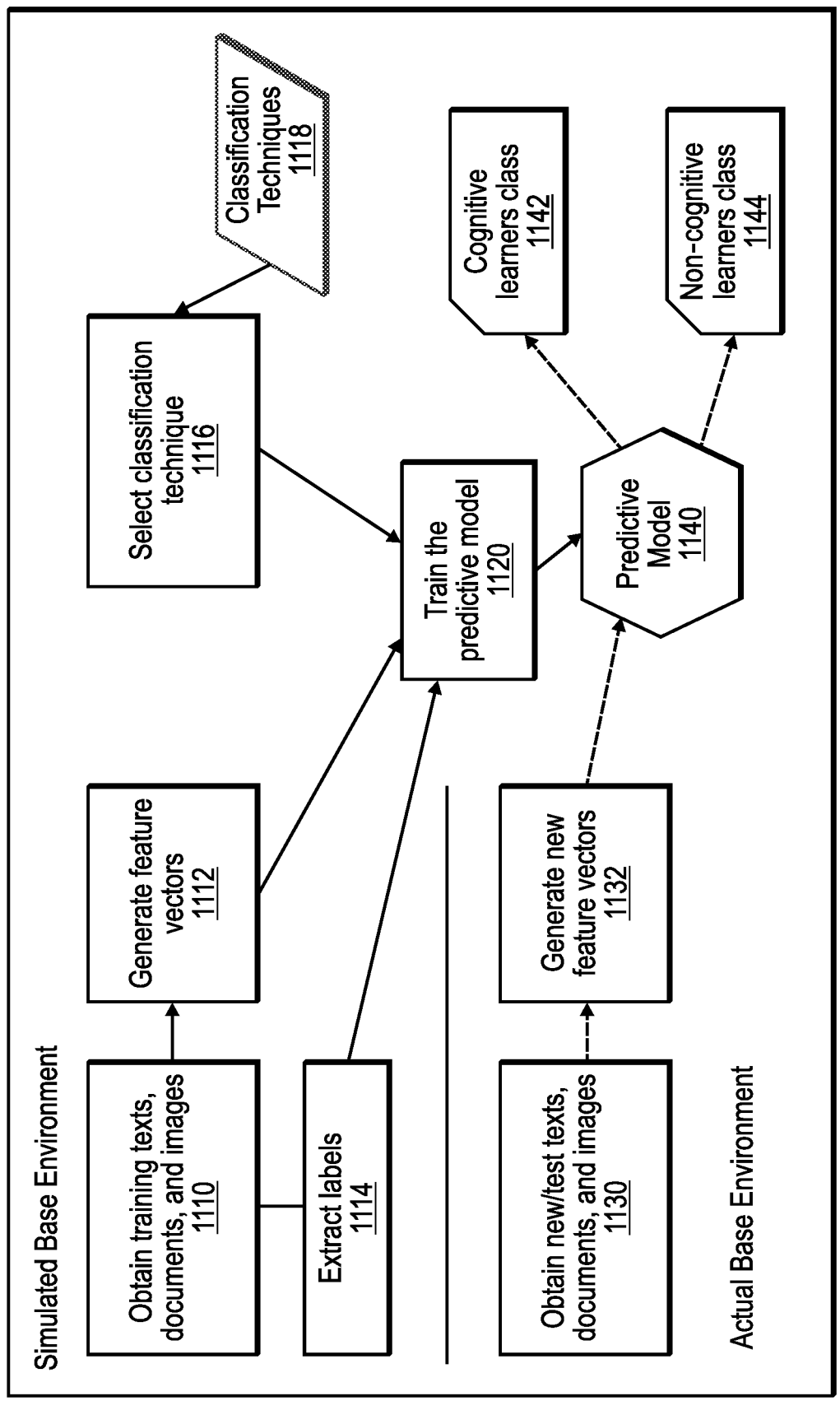
FIG. 11 illustrates classification of learners in accordance with certain embodiments.

FIG. 11 illustrates classification of learners in accordance with certain embodiments. In block 1110, the remote education system 110 obtains training texts, documents, and images. In block 1112, the remote education system 110 generates feature vectors for features of the training texts, documents, and images. In block 1114, the remote education system 110 extracts labels from the training texts, documents, and images. In block 1116, the remote education system 110 selects a classification technique from a set of classification techniques 1118. With embodiments, examples of classification techniques may be: multi-dimensional fuzzy transforms, multilayer perceptron, logistic regression, artificial neural network, etc.

In block 1120, the remote education system 110 uses the labels, the feature vectors, and the selected classification technique to train the predictive model, which results in the predictive model 1140 being ready for use.

In block 1130, the remote education system 110 obtains new and/or test texts, documents, and images. In block 1132, the remote education system 110 generates new feature vectors for features of the new and/or test texts, documents, and images. The predictive model 1140 receives the new feature vectors as input and outputs an indication that the learner is either in a cognitive learners class 1142 or non-cognitive learners class 1144.

In certain embodiments, the predictive model applies weights, and these weights are adjusted by the de-biasing technique.

With embodiments, the remote education system 110 classifies learners based on a threshold limit for any examinee to learn and disseminate knowledge in a cognitive way based on the base environment, the exam environment, and the applicability dimension. In addition, based on the base environment, the exam environment, and the applicability dimension, the remote education system 110 generates a fairness index for the examinee with reference to the other examinees participating in the exam and generates one or more recommendations.

With embodiments, there are n number of simulated base environments SE(n) for each learner, and the remote education system 110 establishes a threshold for each learner. The remote education system 110 records readings of the applicability dimensions for each phase and records readings of the applicability dimensions for the actual exam environment EE(n). A correlation (c1, c2, c3, c4) of each of the applicability dimension for each phase between the simulated base environment threshold and the actual exam environment is derived. This correlation for each learner creates a level playing ground for learners in different remote environments. The threshold and, hence, the correlation becomes more accurate as the learner appears for more simulated and actual exams over a period of time (e.g., throughout a current year and into future years).

Figure 12A:
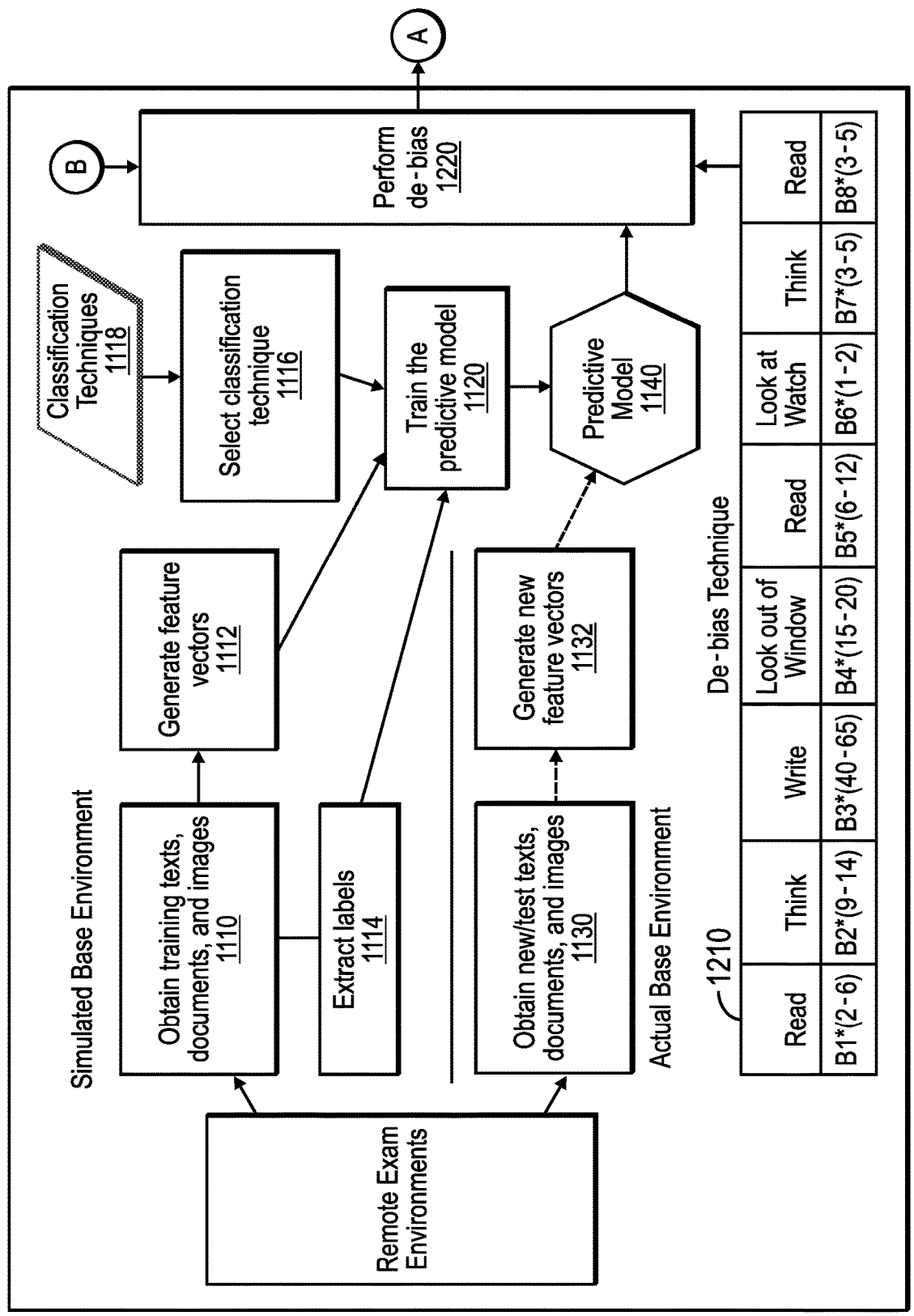
FIGS. 12A and 12B illustrate a de-biasing technique and a feedback loop in accordance with certain embodiments.
Figure 12B:
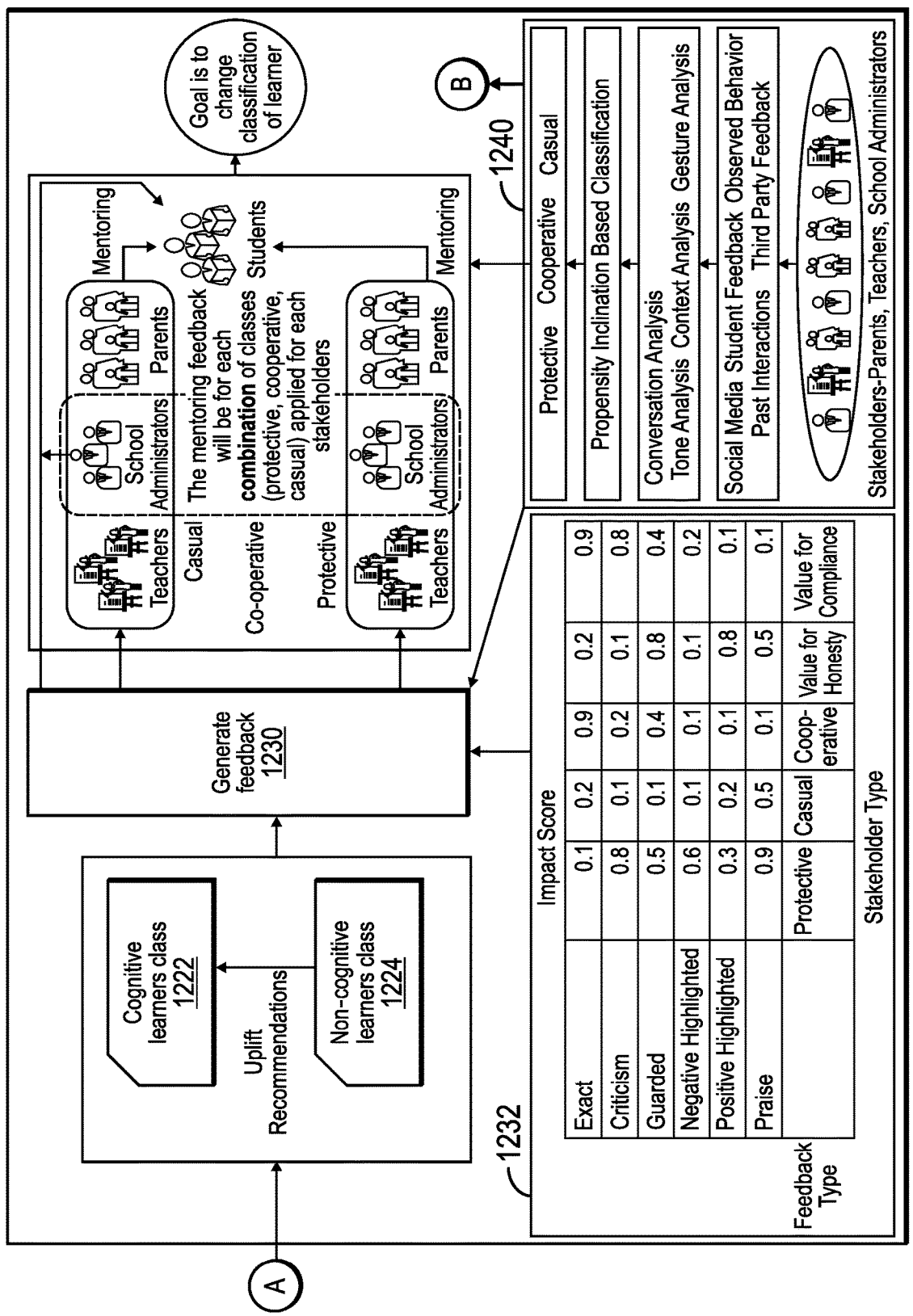

FIGS. 12A and 12B illustrate a de-biasing technique and a feedback loop in accordance with certain embodiments. The classification (i.e., the output of the predictive model 1140), a de-bias technique 1210, and feedback from stakeholders 1240 (e.g., about the simulated base environment or the actual exam environment) go into block 1220. The de-bias technique 1210 provides weights for application to the phases in a cycle (e.g., read, think, write, look out of window, read, look at watch, think, read, which were identified from the data from the actual exam environment of a learner). In block 1220, the remote education system 110 applies the de-bias technique to the output of the predictive model 540 and outputs an updated indication (e.g., a final classification) of whether a learner falls into a cognitive learners class 1222 or a non-cognitive learners class 1224. Once the classification is finalized, the classification becomes input to the feedback generation. With embodiments, the remote education system 110 provides uplift recommendations (e.g., recommendations of additional educational materials) to learners in the non-cognitive learners class to uplift them into the cognitive learners class.

In block 1230, the remote education system 110 generates feedback based on impact scores 1232 and, in some embodiments, based on output (e.g., feedback and/or a classification) from stakeholders 1240. The impact scores 1232 are generated by observations of stakeholders (e.g., teachers, parents, and school administrators). The feedback may include recommended actions. The remote education system 110 sends the feedback to teachers, school administrators, and parents, who may perform the recommended actions (e.g., providing mentoring or other help to assist learners who may benefit from such assistance). The goal of providing assistance is to move a learner from the non-cognitive learners class into the cognitive learners class. In certain embodiments, the remote education system 110 generates three types of feedback: casual, co-operative, and protective. With embodiments, casual feedback may be associated with stakeholders who may not take an action with reference to the learner (e.g., no communication with the learner). With embodiments, co-operative feedback may be associated with stakeholders who may take the feedback and work with the learners to help the learners improve performance in a future exam (e.g., with communication with the learner, reactions expressed to the learner, face to face response to the learner, social media response to the learner, etc.). With embodiments, protective feedback may be associated with stakeholders who try to challenge the learners, provide reasons for the learners to improve performance and follow exam guidelines on future exams, etc.

In certain embodiments, the remote education system 110 receives input from stakeholders. Then, the remote education system 110 collects various data, such as from social media, learner feedback, observed behavior, past interactions, and third party feedback. The remote education system 110 performs conversation analysis, tone analysis, context analysis, and gesture analysis on the various data that was collected. The remote education system 110 generates a propensity inclination-based classification of the cognitive learners class and the non-cognitive learners class. Then, the remote education system 110 provides the feedback of protective, cooperative, and casual. In FIG. 12B, the output of the stakeholders 1240 becomes one of the inputs to the feedback generation. Then, additional feedback is generated for providing additional education materials to learners after an exam and for invigilation during an exam.

FIG. 13 illustrates, in a flowchart, operations for classifying learners and providing feedback in accordance with certain embodiments. In block 1308, the remote education system 110 receives actual base environment capture, analysis, and classification data 1300, simulated base environment context capture, context analysis, and classification data 1302, exam environment context capture and analysis data 1304, and context dimensions 1306 (e.g., exam difficulty, preparedness, and psychological state), performs classification for context, creates a phase wise applicability dimension matrix 1308, and outputs multi-dimensional threshold matrixes across phases, contexts, and environments 1310, which are sent to block 1312. With embodiments, the base environment data (for actual and simulated base environments) is captured and analyzed for the defined phases (e.g., read, write, recheck, pause etc.) and the data is organized across the context dimensions (e.g., exam difficulty, preparedness, psychological state).

In block 1318, the remote education system 110 receives multi-dimensional threshold matrixes as feature vectors 1312 and a de-bias technique 1316 (which is based on de-bias dimensions 1314), and the remote education system 110 identifies a classification as one of a cognitive learners class and a non-cognitive learners class using a predictive model (i.e., a machine learning process). The classification of cognitive learner 1320 or non-cognitive learner 1322, along with impact scores based on stakeholder and feedback classification 1326, are input to block 1324. In block 1324, the remote education system 110 generates feedback. In certain embodiments, any feedback from stakeholders, in addition to the impact scores, is also used to generate the feedback. In block 1324, the remote education system 110 also generates feedback that is used to update the multi-dimensional threshold matrixes across phases, contexts, and environments 1310, update the multi-dimensional threshold matrix as feature vectors 1312, generate a multi-dimensional correlation 1330, and generate a deviation from a threshold 1330. In block 1332, the remote education system 110 automatically provides additional education materials to each learner in the non-cognitive class to move that learner into the cognitive class 1332 (e.g., by automatically selecting education material for subjects covered in the exam that may help the learner and playing the educational material on the remote learner computer 150a . . . 150n). In block 1334, for each learner in the non-cognitive class, the remote education system 110 identifies a teacher learning device for a teacher for that learner and sends feedback and a notification that the learner is in the non-cognitive class 1334 so that the teacher is able to provide more assistance to the learner and/or ensure that the learner adheres to exam guidelines. For example, the feedback may recommend actions, and the teacher may take any such recommended action.

Figure 14:
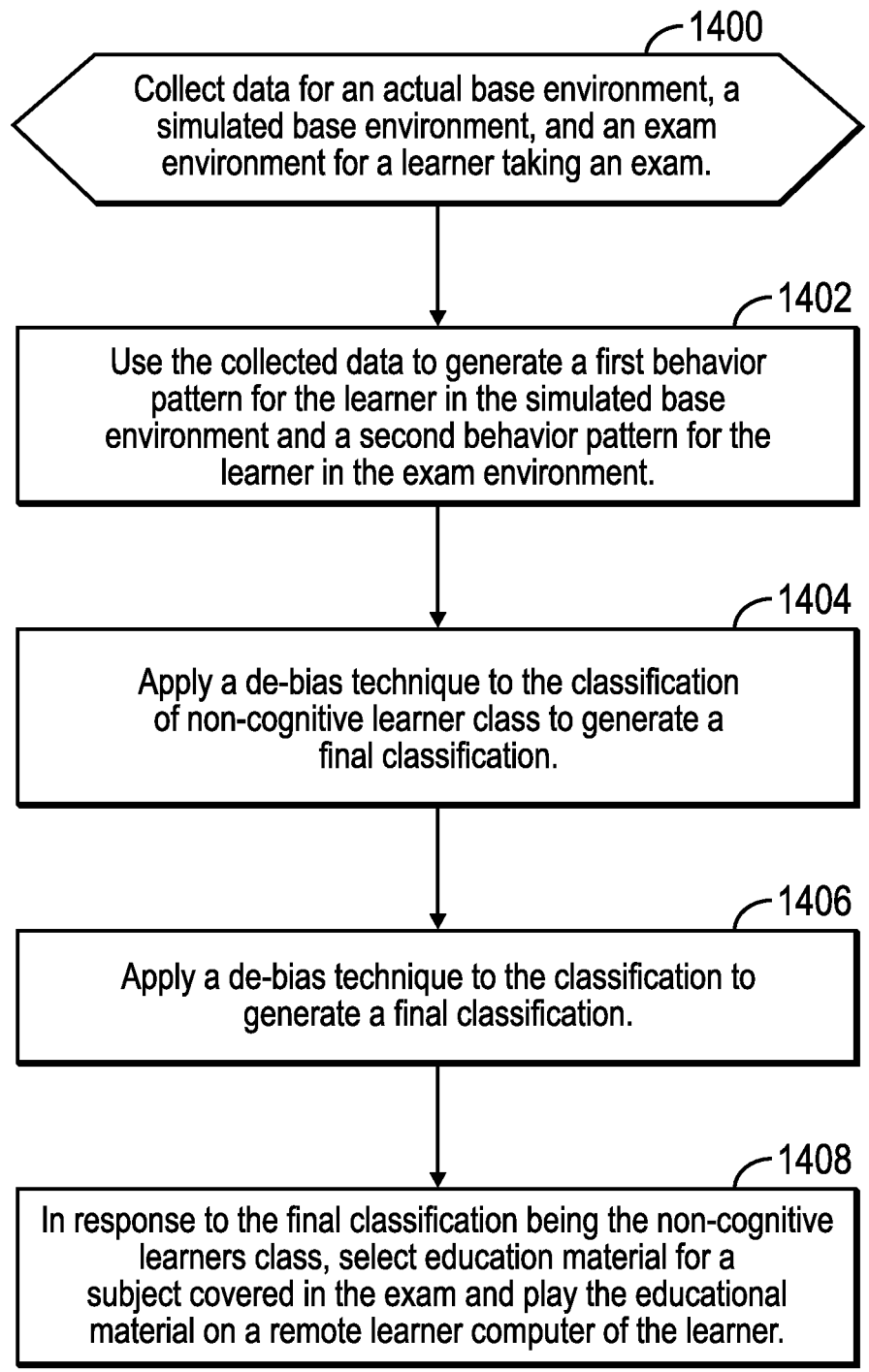
FIG. 14 illustrates, in a flowchart, operations for remote education in accordance with certain embodiments.

FIG. 14 illustrates, in a flowchart, operations for remote education in accordance with certain embodiments. Control begins at block 1400 with the remote education system 110 collecting data for an actual base environment, a simulated base environment, and an exam environment for a learner taking an exam. In block 1402, the remote education system 110 uses the collected data to generate a first behavior pattern for the learner in the simulated base environment and a second behavior pattern for the learner in the exam environment. In block 1404, in response to the second behavior pattern deviating beyond a threshold from the first behavior pattern, the remote education system 110 classifies the learner in a non-cognitive learners class. In block 1406, the remote education system 110 applies a de-bias technique to the classification to generate a final classification. In block 1408, in response to the final classification being the non-cognitive learners class, the remote education system 110 selects education material for a subject covered in the exam and plays the educational material on a remote learner computer of the learner.

In certain embodiments, the remote education system 110 classifies cognitive learners and non-cognitive learners based on a threshold limit for any examinee to learn and disseminate knowledge, while following exam guidelines, in a natural, fair and cognitive way based on the base environment, the exam environment, and the applicability dimension. In addition to classifying the learners, the remote education system 110 generates a fairness index, which is a metric that quantitatively measures the extent to which the learner is following exam guidelines, while taking the exam. In certain embodiments, the remote education system 110 captures/records the base environment measurement to compare against corresponding exam time records for application of suitable analytics to determine signification deviation of behavior between class learning and exam taking.

In certain embodiments, the remote education system 110 defines the base environment with visual and auditory signals, periodicity and phases, and an emotional and psychometric index. The emotional and psychometric index may be described as metrics or quantifiable measurements from the analysis of data from bodily worn learner biometric devices and social communication (e.g., on social media).

In certain embodiments, the remote education system 110 defines patterns, such as deviation in periodicity, phases of writing exam and a pattern of spike that needs to be analyzed to determine the deviation of base environment dimensions from exam time with that of a simulation/mock environment. This may lead an examinee to be noted for tailored invigilation.

In certain embodiments, the remote education system 110 defines a vector of metrics for a) base environment dimensions $BE(n)$ (given under exam environment $EE(n)$) in correlation with b) the classified contexts $C(n)$ and the c) applicable threshold $Th(n)$ that determines the allowed deviation of those base environment dimensions $BE(n)$ (given under a simulated base environment $SE(n)$).

In certain embodiments, the remote education system 110 defines the threshold $Th(n)$ and computes the threshold value for a particular subject, of deviation of the Base Environment Dimensions from exam time with that of a simulation/mock environment, depending on the propensity inclination of the classification (i.e., the class of cognitive learner or non-cognitive learner that the candidate belongs to depending on the propensity inclination of the candidate).

In certain embodiments, the remote education system 110 quantitatively records a learner's behavioral pattern and engagement levels during class.

In certain embodiments, the remote education system 110 predicts an examinee's propensity inclination dimension to adopt fair means during an exam based on a predictive model built through analysis of behavioral patterns and propensity inclinations exhibited in a set of classes (e.g., classes throughout the academic year).

In certain embodiments, the remote education system 110 recommends to the exam system (invigilators/teachers), in real time, a personalized invigilation mode for every examinee based on the deviation from threshold $Th(n)$ from the base environment for a particular subject, applied for a plurality of contexts.

In certain embodiments, the remote education system 110 takes the vector of metrics for the base environment and the outcome of the predictive classifier model to assess the bias and apply appropriate a de-bias factor to improve the model for classifying the cognitive learner and knowledge disseminator.

In certain embodiments, the remote education system 110 classifies the stakeholders (e.g., teachers, parents, learners, and administrators), participating in an education system that helps organize the feedback communication in an efficient way to help each stakeholder participate and contribute in the education system in a more adaptive way resulting in a better learning experience that meets the objectives of the education system.

In certain embodiments, the remote education system 110, based on metrics, selects an appropriate class of feedback from a metrics of classified feedback to be sent to one or more classes of appropriate stakeholders, from metrics of the classified stakeholders, about each learner (of appropriate class based on value system) and observes whether the net result is appreciable improvement or not. In certain embodiments, any improvement is determined based on the learner's behavior patterns in future classes and exams, as expressed through future feedback. Based on these metrics, the remote education system 110 adjusts the communication workflow to get the feedback to the appropriate stakeholder about each learner.

In certain embodiments, the remote education system 110 provides a hybrid cognitive learning smart workflow that a) captures a base environment during classroom work either in classroom mode or remote mode, b) classifies the cognitive learner and knowledge disseminators, c) applies a de-bias value to the outcome of the classifier, and d) provides feedback to the appropriate stakeholder in accordance with the overall objectives of the education system.

In certain embodiments, the remote education system 110 analyzes the learner's behavioral patterns while the learner is attending classes (e.g., during the academic year), establishes a learner's propensity inclination index to indulge in un-fair means through analysis of the learners behavioral patterns, analyzes the learners phase-wise exam behavior during simulated exam environments, and then correlates these parameters with the learner's actual exam environment behavioral pattern to catch any deviation beyond an acceptable threshold. Based on the deviation beyond the acceptable threshold of a specific learner in an on-line or physical exam environment, the remote education system 110 provides a recommendation to the invigilator to be more watchful to the activities/needs of a specific learner during the exam.

In certain embodiments, the remote education system 110 captures the examinee's base environment to establish an individual examinee centric "typical behavior". With embodiments, the behavior, gaze, facial expressions of a first learner taking an exam remotely from a first home environment may be different from that of a second learner taking the exam from a second home environment because the home environments are different. The remote education system 110 determines one or more typical behaviors during an exam for each learner. The remote education system 110 uses (Artificial Intelligence (AI) (i.e., the predictive model) to perform analysis of typical behavior based on establishing a learner's typical behavior through mapping of the base environment. The remote education system 110 also provides real time monitoring and interactive decision making.

Figure 15:
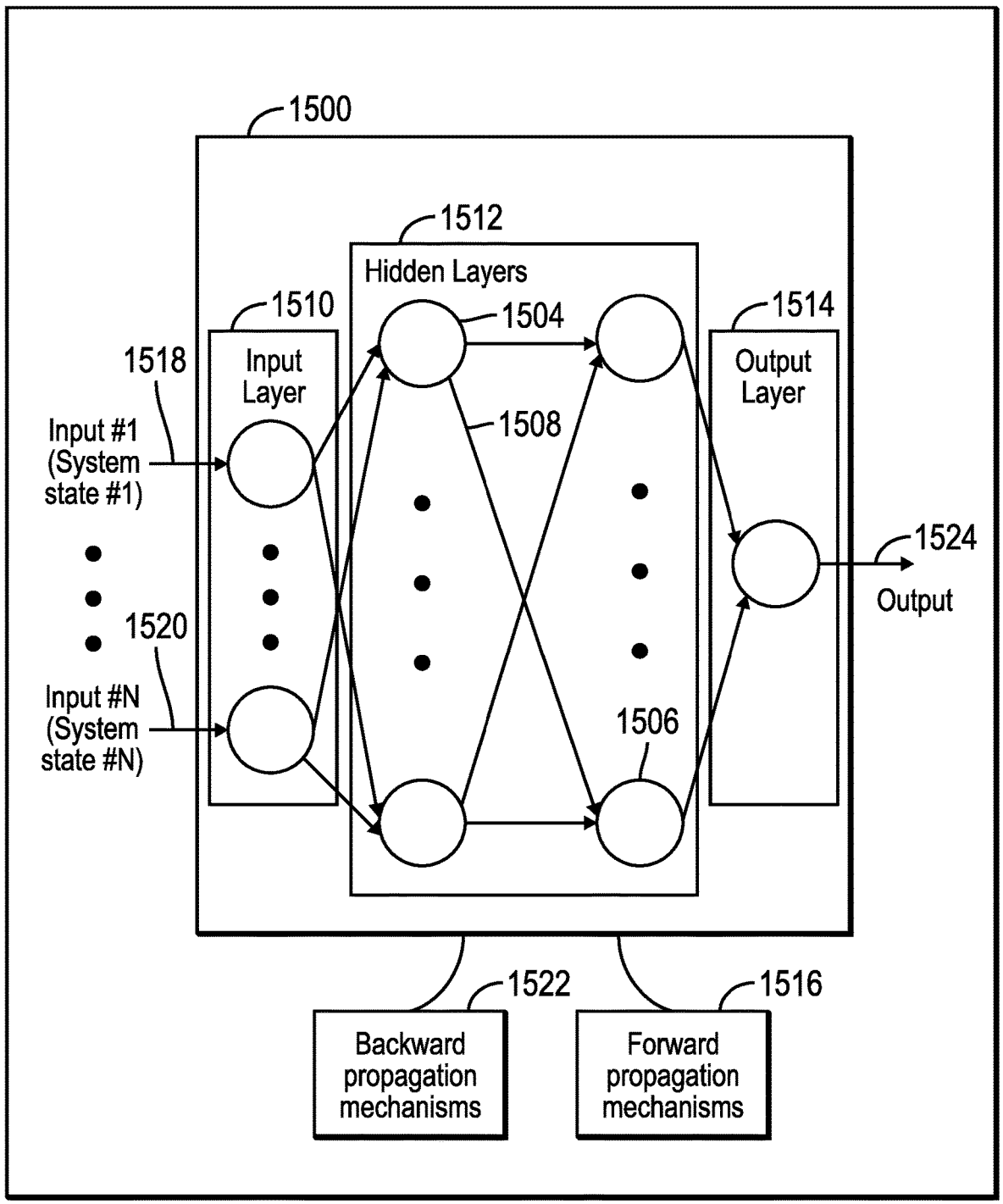
FIG. 15 illustrates, in a block diagram, details of a machine learning model in accordance with certain embodiments.

FIG. 15 illustrates, in a block diagram, details of a machine learning model 1500 in accordance with certain embodiments. In certain embodiments, the predictive model 120 is implemented using the components of the machine learning model 1500.

The machine learning model 1500 may comprise a neural network with a collection of nodes with links connecting them, where the links are referred to as connections. For example, FIG. 15 shows a node 1504 connected by a connection 1508 to the node 1506. The collection of nodes may be organized into three main parts: an input layer 1510, one or more hidden layers 1512, and an output layer 1514.

The connection between one node and another is represented by a number called a weight, where the weight may be either positive (if one node excites another) or negative (if one node suppresses or inhibits another). Training the machine learning model 1500 entails calibrating the weights in the machine learning model 1500 via mechanisms referred to as forward propagation 1516 and backward propagation 1522. Bias nodes that are not connected to any previous layer may also be maintained in the machine learning model 1500. A bias may be described as an extra input of 1 with a weight attached to it for a node.

In forward propagation 1516, a set of weights are applied to the input data 1518 . . . 1520 to calculate the output 1524. For the first forward propagation, the set of weights may be selected randomly or set by, for example, a system administrator. That is, in the forward propagation 1516, embodiments apply a set of weights to the input data 1518 . . . 1520 and calculate an output 1524.

In backward propagation 1522 a measurement is made for a margin of error of the output 1524, and the weights are adjusted to decrease the error. Backward propagation 1522 compares the output that the machine learning model 1500 produces with the output that the machine learning model 1500 was meant to produce, and uses the difference between them to modify the weights of the connections between the nodes of the machine learning model 1500, starting from the output layer 1514 through the hidden layers 1512 to the input layer 1510, i.e., going backward in the machine learning model 1500. In time, backward propagation 1522 causes the machine learning model 1500 to learn, reducing the difference between actual and intended output to the point where the two come very close or coincide.

The machine learning model 1500 may be trained using backward propagation to adjust weights at nodes in a hidden layer to produce adjusted output values based on the provided inputs 1518 . . . 1520. A margin of error may be determined with respect to the actual output 1524 from the machine learning model 1500 and an expected output to train the machine learning model 1500 to produce the desired output value based on a calculated expected output. In backward propagation, the margin of error of the output may be measured and the weights at nodes in the hidden layers 1512 may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

Thus, the machine learning model 1500 is configured to repeat both forward and backward propagation until the weights of the machine learning model 1500 are calibrated to accurately predict an output.

The machine learning model 1500 implements a machine learning technique such as decision tree learning, association rule learning, artificial neural network, inductive programming logic, support vector machines, Bayesian models, etc., to determine the output value 1524.

In certain machine learning model 1500 implementations, weights in a hidden layer of nodes may be assigned to these inputs to indicate their predictive quality in relation to other of the inputs based on training to reach the output value 1524.

With embodiments, the machine learning model 1500 is a neural network, which may be described as a collection of "neurons" with "synapses" connecting them.

With embodiments, there may be multiple hidden layers 1512, with the term "deep" learning implying multiple hidden layers. Hidden layers 1512 may be useful when the neural network has to make sense of something complicated, contextual, or non-obvious, such as image recognition. The term "deep" learning comes from having many hidden layers. These layers are known as "hidden", since they are not visible as a network output.

In certain embodiments, training a neural network may be described as calibrating all of the "weights" by repeating the forward propagation 1516 and the backward propagation 1522.

In backward propagation 1522, embodiments measure the margin of error of the output and adjust the weights accordingly to decrease the error.

Neural networks repeat both forward and backward propagation until the weights are calibrated to accurately predict the output 1524.

In certain embodiments, the inputs to the machine learning model 1500 are new feature vectors, and the outputs of the machine learning model 1500 are classifications of learners. In certain embodiments, the machine learning model may be refined based on whether the outputted recommendations, once taken, generate positive outcomes.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 16:
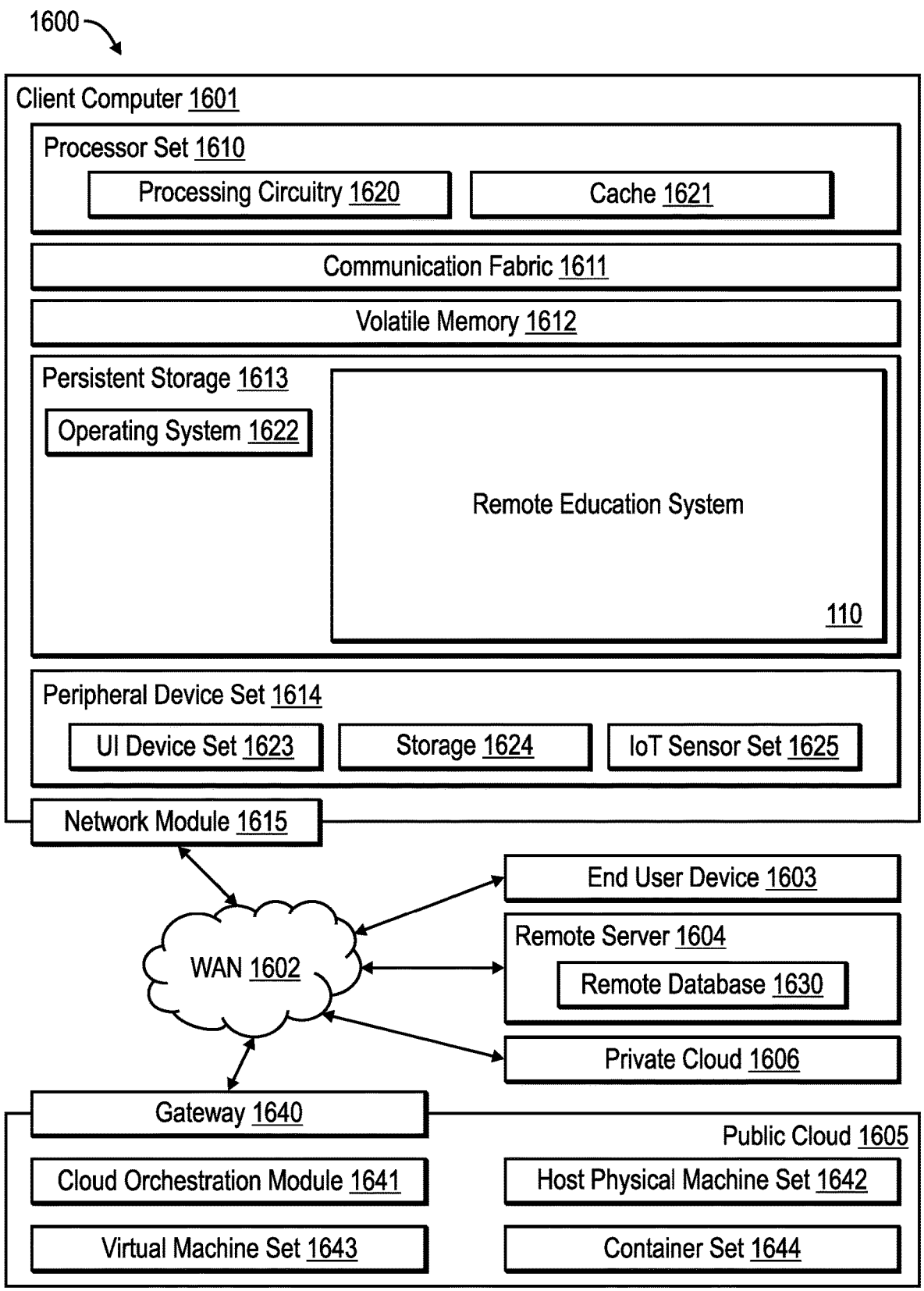
FIG. 16 illustrates a computing environment in accordance with certain embodiments.

FIG. 16 illustrates a computing environment 1600 in accordance with certain embodiments. In certain embodiments, the remote education system 110, each remote learner device, and each remote teacher device are computing environments 1600. Computing environment 1600 contains an example of an environment for the execution of at least some of the computer code involved in performing the inventive methods, such as remote education system 110, which works with a local education system at another computing environment (for the remote learner device) and with a teacher education system at yet another computing environment (for the remote teacher device). In addition to block 110, computing environment 1600 includes, for example, computer 1601, wide area network (WAN) 1602, end user device (EUD) 1603, remote server 1604, public cloud 1605, and private cloud 1606. In this embodiment, computer 1601 includes processor set 1610 (including processing circuitry 1620 and cache 1621), communication fabric 1611, volatile memory 1612, persistent storage 1613 (including operating system 1622 and block 110, as identified above), peripheral device set 1614 (including user interface (UI) device set 1623, storage 1624, and Internet of Things (IoT) sensor set 1625), and network module 1615. Remote server 1604 includes remote database 1630. Public cloud 1605 includes gateway 1640, cloud orchestration module 1641, host physical machine set 1642, virtual machine set 1643, and container set 1644.

COMPUTER 1601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1630. As is well understood in the art of computer technology, and depending upon the technology, performance of a computer-implemented method may be distributed among multiple computers and/or between multiple locations. On the other hand, in this presentation of computing environment 1600, detailed discussion is focused on a single computer, specifically computer 1601, to keep the presentation as simple as possible. Computer 1601 may be located in a cloud, even though it is not shown in a cloud in FIG. 16. On the other hand, computer 1601 is not required to be in a cloud except to any extent as may be affirmatively indicated.

PROCESSOR SET 1610 includes one, or more, computer processors of any type now known or to be developed in the future. Processing circuitry 1620 may be distributed over multiple packages, for example, multiple, coordinated integrated circuit chips. Processing circuitry 1620 may implement multiple processor threads and/or multiple processor cores. Cache 1621 is memory that is located in the processor chip package(s) and is typically used for data or code that should be available for rapid access by the threads or cores running on processor set 1610. Cache memories are typically organized into multiple levels depending upon relative proximity to the processing circuitry. Alternatively, some, or all, of the cache for the processor set may be located "off chip." In some computing environments, processor set 1610 may be designed for working with qubits and performing quantum computing.

Computer readable program instructions are typically loaded onto computer 1601 to cause a series of operational steps to be performed by processor set 1610 of computer 1601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1621 and the other storage media discussed below. The program instructions, and associated data, are accessed by processor set 1610 to control and direct performance of the inventive methods. In computing environment 1600, at least some of the instructions for performing the inventive methods may be stored in block 110 in persistent storage 1613.

COMMUNICATION FABRIC 1611 is the signal conduction path that allows the various components of computer 1601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1612 is any type of volatile memory now known or to be developed in the future. Examples include dynamic type random access memory (RAM) or static type RAM. Typically, volatile memory 1612 is characterized by random access, but this is not required unless affirmatively indicated. In computer 1601, the volatile memory 1612 is located in a single package and is internal to computer 1601, but, alternatively or additionally, the volatile memory may be distributed over multiple packages and/or located externally with respect to computer 1601.

PERSISTENT STORAGE 1613 is any form of non-volatile storage for computers that is now known or to be developed in the future. The non-volatility of this storage means that the stored data is maintained regardless of whether power is being supplied to computer 1601 and/or directly to persistent storage 1613. Persistent storage 1613 may be a read only memory (ROM), but typically at least a portion of the persistent storage allows writing of data, deletion of data and re-writing of data. Some familiar forms of persistent storage include magnetic disks and solid state storage devices. Operating system 1622 may take several forms, such as various known proprietary operating systems or open source Portable Operating System Interface-type operating systems that employ a kernel. The code included in block 110 typically includes at least some of the computer code involved in performing the inventive methods.

PERIPHERAL DEVICE SET 1614 includes the set of peripheral devices of computer 1601. Data communication connections between the peripheral devices and the other components of computer 1601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1623 may include components such as a display screen, speaker, microphone, wearable devices (such as goggles and smart watches), keyboard, mouse, printer, touchpad, game controllers, and haptic devices. Storage 1624 is external storage, such as an external hard drive, or insertable storage, such as an SD card. Storage 1624 may be persistent and/or volatile. In some embodiments, storage 1624 may take the form of a quantum computing storage device for storing data in the form of qubits. In embodiments where computer 1601 is required to have a large amount of storage (for example, where computer 1601 locally stores and manages a large database) then this storage may be provided by peripheral storage devices designed for storing very large amounts of data, such as a storage area network (SAN) that is shared by multiple, geographically distributed computers. IoT sensor set 1625 is made up of sensors that can be used in Internet of Things applications. For example, one sensor may be a thermometer and another sensor may be a motion detector.

NETWORK MODULE 1615 is the collection of computer software, hardware, and firmware that allows computer 1601 to communicate with other computers through WAN 1602. Network module 1615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1615 are performed on the same physical hardware device. In other embodiments (for example, embodiments that utilize software-defined networking (SDN)), the control functions and the forwarding functions of network module 1615 are performed on physically separate devices, such that the control functions manage several different network hardware devices. Computer readable program instructions for performing the inventive methods can typically be downloaded to computer 1601 from an external computer or external storage device through a network adapter card or network interface included in network module 1615.

WAN 1602 is any wide area network (for example, the internet) capable of communicating computer data over non-local distances by any technology for communicating computer data, now known or to be developed in the future. In some embodiments, the WAN 1602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1603 is any computer system that is used and controlled by an end user (for example, a customer of an enterprise that operates computer 1601), and may take any of the forms discussed above in connection with computer 1601. EUD 1603 typically receives helpful and useful data from the operations of computer 1601. For example, in a hypothetical case where computer 1601 is designed to provide a recommendation to an end user, this recommendation would typically be communicated from network module 1615 of computer 1601 through WAN 1602 to EUD 1603. In this way, EUD 1603 can display, or otherwise present, the recommendation to an end user. In some embodiments, EUD 1603 may be a client device, such as thin client, heavy client, mainframe computer, desktop computer and so on.

REMOTE SERVER 1604 is any computer system that serves at least some data and/or functionality to computer 1601. Remote server 1604 may be controlled and used by the same entity that operates computer 1601. Remote server 1604 represents the machine(s) that collect and store helpful and useful data for use by other computers, such as computer 1601. For example, in a hypothetical case where computer 1601 is designed and programmed to provide a recommendation based on historical data, then this historical data may be provided to computer 1601 from remote database 1630 of remote server 1604.

PUBLIC CLOUD 1605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1605 is performed by the computer hardware and/or software of cloud orchestration module 1641. The computing resources provided by public cloud 1605 are typically implemented by virtual computing environments that run on various computers making up the computers of host physical machine set 1642, which is the universe of physical computers in and/or available to public cloud 1605. The virtual computing environments (VCEs) typically take the form of virtual machines from virtual machine set 1643 and/or containers from container set 1644. It is understood that these VCEs may be stored as images and may be transferred among and between the various physical machine hosts, either as images or after instantiation of the VCE. Cloud orchestration module 1641 manages the transfer and storage of images, deploys new instantiations of VCEs and manages active instantiations of VCE deployments. Gateway 1640 is the collection of computer software, hardware, and firmware that allows public cloud 1605 to communicate through WAN 1602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1606 is similar to public cloud 1605, except that the computing resources are only available for use by a single enterprise. While private cloud 1606 is depicted as being in communication with WAN 1602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1605 and private cloud 1606 are both part of a larger hybrid cloud.

Additional Embodiment Details

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended.

The foregoing description provides examples of embodiments of the invention, and variations and substitutions may be made in other embodiments.

What is claimed is:

1. A computer-implemented method, comprising operations for:

collecting data for an actual base environment, a simulated base environment, and an exam environment for a learner taking an exam;

training a predictive model with the collected data for the simulated base environment;

using the collected data for the actual base environment, the simulated base environment, and the exam environment to generate a first behavior pattern for the learner in the simulated base environment and a second behavior pattern for the learner in the exam environment;

in response to the second behavior pattern deviating beyond a threshold from the first behavior pattern, determining a classification of non-cognitive learners class for the learner using the predictive model for the actual base environment;

applying a de-bias technique to the classification to generate a final classification; and in response to the final classification being the non-cognitive learners class,
    selecting education material for a subject covered in the exam; and
    playing the educational material on a remote learner computer of the learner.

2. The computer-implemented method of claim 1, comprising further operations for:
    based on the final classification being the non-cognitive learners class,
        identifying a teacher learning device for a teacher for the learner; and
        sending a recommendation of tailored invigilation for the learner.

3. The computer-implemented method of claim 1, comprising further operations for:
    identifying context dimensions of exam difficulty, preparedness, and psychological state from the collected data;
    identifying phases of read, write, pause, and recheck from the collected data;
    generating a multi-dimensional threshold matrix for the simulated base environment;
    generating an exam environment matrix; and
    identifying a multi-dimensional correlation based on the multi-dimensional threshold matrix and the exam environment matrix, wherein the multi-dimensional correlation is based on values of each of the phases against values of each of the context dimensions.

4. The computer-implemented method of claim 3, comprising further operations for:
    in response to the final classification being the non-cognitive learners class,
        sending feedback to one or more stakeholders;
        receiving classification data and one or more impact scores from the one or more stakeholders; and
        updating the feedback based on the classification data and the one or more impact scores.

5. The computer-implemented method of claim 3, comprising further operations for:
    determining whether the learner moved to the cognitive learners class based on a new pattern of behavior during a new exam; and
    based on the determination, updating feedback for the learner.

6. The computer-implemented method of claim 1, wherein the data for the actual base environment and the exam environment is collected from any combination of: one or more cameras, one or more microphones, one or more bodily worn learner biometric devices, one or more sensors, and one or more Internet of Things (IoT) devices.

7. The computer-implemented method of claim 1, wherein the educational material comprises a video.

8. A computer program product, the computer program product comprising a computer readable storage medium having program code embodied therewith, the program code executable by at least one processor to perform operations for:
    collecting data for an actual base environment, a simulated base environment, and an exam environment for a learner taking an exam;
    training a predictive model with the collected data for the simulated base environment;
    using the collected data for the actual base environment, the simulated base environment, and the exam environment to generate a first behavior pattern for the learner in the simulated base environment and a second behavior pattern for the learner in the exam environment;
    in response to the second behavior pattern deviating beyond a threshold from the first behavior pattern, determining a classification of non-cognitive learners class for the learner using the predictive model for the actual base environment;
    applying a de-bias technique to the classification to generate a final classification; and
    in response to the final classification being the non-cognitive learners class,
        selecting education material for a subject covered in the exam; and
        playing the educational material on a remote learner computer of the learner.

9. The computer program product of claim 8, wherein the program code is executable by the at least one processor to perform operations for:
    based on the final classification being the non-cognitive learners class,
        identifying a teacher learning device for a teacher for the learner; and
        sending a recommendation of tailored invigilation for the learner.

10. The computer program product of claim 8, wherein the program code is executable by the at least one processor to perform operations for:
    identifying context dimensions of exam difficulty, preparedness, and psychological state from the collected data;
    identifying phases of read, write, pause, and recheck from the collected data;
    generating a multi-dimensional threshold matrix for the simulated base environment;
    generating an exam environment matrix; and
    identifying a multi-dimensional correlation based on the multi-dimensional threshold matrix and the exam environment matrix, wherein the multi-dimensional correlation is based on values of each of the phases against values of each of the context dimensions.

11. The computer program product of claim 8, wherein the program code is executable by the at least one processor to perform operations for:
    in response to the final classification being the non-cognitive learners class,
        sending feedback to one or more stakeholders;
        receiving classification data and one or more impact scores from the one or more stakeholders; and
        updating the feedback based on the classification data and the one or more impact scores.

12. The computer program product of claim 8, wherein the program code is executable by the at least one processor to perform operations for:
    determining whether the learner moved to the cognitive learners class based on a new pattern of behavior during a new exam; and
    based on the determination, updating feedback for the learner.

13. The computer program product of claim 8, wherein the data for the actual base environment and the exam environment is collected from any combination of: one or more cameras, one or more microphones, one or more bodily worn learner biometric devices, one or more sensors, and one or more Internet of Things (IoT) devices.

14. The computer program product of claim 8, wherein the educational material comprises a video.

15. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
collecting data for an actual base environment, a simulated base environment, and an exam environment for a learner taking an exam;
training a predictive model with the collected data for the simulated base environment;
using the collected data for the actual base environment, the simulated base environment, and the exam environment to generate a first behavior pattern for the learner in the simulated base environment and a second behavior pattern for the learner in the exam environment;
in response to the second behavior pattern deviating beyond a threshold from the first behavior pattern, determining a classification of non-cognitive learners class for the learner using the predictive model for the actual base environment;
applying a de-bias technique to the classification to generate a final classification; and
in response to the final classification being the non-cognitive learners class,
selecting education material for a subject covered in the exam; and
playing the educational material on a remote learner computer of the learner.

16. The computer system of claim 15, wherein the operations further comprise:
based on the final classification being the non-cognitive learners class,
identifying a teacher learning device for a teacher for the learner; and
sending a recommendation of tailored invigilation for the learner.

17. The computer system of claim 15, wherein the operations further comprise:
identifying context dimensions of exam difficulty, preparedness, and psychological state from the collected data;
identifying phases of read, write, pause, and recheck from the collected data;
generating a multi-dimensional threshold matrix for the simulated base environment;
generating an exam environment matrix; and
identifying a multi-dimensional correlation based on the multi-dimensional threshold matrix and the exam environment matrix, wherein the multi-dimensional correlation is based on values of each of the phases against values of each of the context dimensions.

18. The computer system of claim 15, wherein the operations further comprise:
in response to the final classification being the non-cognitive learners class,
sending feedback to one or more stakeholders;
receiving classification data and one or more impact scores from the one or more stakeholders; and
updating the feedback based on the classification data and the one or more impact scores.

19. The computer system of claim 15, wherein the operations further comprise:
determining whether the learner moved to the cognitive learners class based on a new pattern of behavior during a new exam; and
based on the determination, updating feedback for the learner.

20. The computer system of claim 15, wherein the educational material comprises a video.

* * * * *